US012732257B2

(12) United States Patent
Yang et al.

(10) Patent No.: US 12,732,257 B2
(45) Date of Patent: Sep. 8, 2026

(54) CHANNEL TRACKING OVER SIDELINK

(71) Applicant: QUALCOMM Incorporated, San Diego, CA (US)

(72) Inventors: Wei Yang, San Diego, CA (US); Seyedkianoush Hosseini, San Diego, CA (US); Alexandros Manolakos, Escondido, CA (US)

(73) Assignee: Qualcomm Incorporated, San Diego, CA (US)

( * ) Notice: Subject to any disclaimer, the term of this patent is extended or adjusted under 35 U.S.C. 154(b) by 468 days.

(21) Appl. No.: 18/262,166

(22) PCT Filed: Feb. 9, 2022

(86) PCT No.: PCT/US2022/015790
§ 371 (c)(1),
(2) Date: Jul. 19, 2023

(87) PCT Pub. No.: WO2022/211908
PCT Pub. Date: Oct. 6, 2022

(65) Prior Publication Data
US 2024/0080085 A1 Mar. 7, 2024

(30) Foreign Application Priority Data
Mar. 30, 2021 (GR) .............................. 20210100213

(51) Int. Cl.
*H04B 7/06* (2006.01)
*H04W 72/25* (2023.01)
*H04W 92/18* (2009.01)

(52) U.S. Cl.
CPC ........ *H04B 7/06968* (2023.05); *H04W 72/25* (2023.01); *H04W 92/18* (2013.01)

(58) Field of Classification Search
CPC . H04B 7/06968; H04B 7/0617; H04W 72/25; H04W 92/18; H04W 72/20; H04L 5/0053; H04L 25/0228; H04L 25/0226
See application file for complete search history.

(56) References Cited

U.S. PATENT DOCUMENTS

2019/0254120 A1* 8/2019 Zhang .................... H04B 7/088
2020/0336253 A1 10/2020 He et al.
2025/0158754 A1* 5/2025 Moon .................. H04L 1/1861

OTHER PUBLICATIONS

International Search Report and Written Opinion—PCT/US2022/015790—ISA/EPO—Jun. 8, 2022.

(Continued)

*Primary Examiner* — Thomas R Cairns
*Assistant Examiner* — Raenita Ann Fenner
(74) *Attorney, Agent, or Firm* — Loza & Loza, LLP

(57) ABSTRACT

Aspects relate to sidelink channel tracking using quasi co-location (QCL) information for a sidelink channel between wireless communication devices (e.g., UEs). A transmitting UE may identify the QCL information for a sidelink transmission to a receiving UE over the sidelink channel and transmit an indication of the QCL information to the receiving UE. The indication of the QCL information may be representative of one or more large-scale channel properties (LSCPs) associated with the sidelink transmission. The receiving UE may then process the sidelink transmission based on the one or more LSCPs.

20 Claims, 12 Drawing Sheets

(56) References Cited

OTHER PUBLICATIONS

Mediatek Inc: "Discussion on Sidelink Physical Layer Structure", 3GPP Draft, 3GPP TSG RAN WG1 #101, R1-2003681, 3rd Generation Partnership Project (3GPP), Mobile Competence Centre, 650, Route Des Lucioles, F-06921 Sophia-Antipolis Cedex, France, vol. RAN WG1, No. e-Meeting, May 25, 2020-Jun. 5, 2020, May 16, 2020 (May 16, 2020), XP051885456, 11 Pages, Issue 3, p. 7 Issue 6, p. 9.

NTT Docomo, et al., "RLM/RLF for NR Sidelink", 3GPP TSG RAN WG1 #98bis, R1-1911174_DCM_RLM/RLF_FIN, 3rd Generation Partnership Project, Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 8, 2019, XP051809301, 2 Pages.

Vivo: "Remaining Issues on Sidelink Synchronization Mechanism", 3GPP TSG RAN WG1 #100 bis, R1-2001663, 3rd Generation Partnership Project, Mobile Competence Centre, 650, Route Des Lucioles, F-06921 Sophia-Antipolis Cedex, France, vol. RAN WG1, No. e-Meeting, Apr. 20, 2020-Apr. 30, 2020, Apr. 11, 2020, XP051875226, 8 Pages.

* cited by examiner

400a
Frequency
Time
416
402
414
420
408a
412
406
408b
410
418
404

400b
Frequency
Time
416
414
402
420
414
408
412
406
412
410
418
404

PSSCH
DMRS
Gap
AGC Symbol
PSCCH SCI-1
DMRS/ SCI-2

CHANNEL TRACKING OVER SIDELINK

CROSS-REFERENCE TO RELATED APPLICATIONS

This application is the U.S. national stage of PCT patent application number PCT/US22/15790 filed on Feb. 9, 2022. The present Application for Patent also claims priority to Greece application no. 20210100213, filed Mar. 30, 2021, and assigned to the assignee hereof and hereby expressly incorporated by reference herein as if fully set forth below and for all applicable purposes.

TECHNICAL FIELD

The technology discussed below relates generally to wireless communication networks, and more particularly, to channel tracking over sidelink through quasi co-location (QCL).

BACKGROUND

Wireless communication between devices may be facilitated by various network configurations. In one configuration, a cellular network may enable user equipment (UEs) to communicate with one another through signaling with a nearby base station or cell. Another wireless communication network configuration is a device to device (D2D) network in which UEs may signal one another directly, rather than via an intermediary base station or cell. For example, D2D communication networks may utilize sidelink signaling to facilitate the direct communication between UEs over a proximity service (ProSe) PC5 interface. In some sidelink network configurations, UEs may further communicate in a cellular network, generally under the control of a base station. Thus, the UEs may be configured for uplink and downlink signaling via a base station and further for sidelink signaling directly between the UEs without transmissions passing through the base station.

One example of a sidelink wireless communication network is a vehicle-to-everything (V2X) communication network. V2X communication involves the exchange of information not only between vehicles themselves, but also between vehicles and external systems, such as streetlights, buildings, pedestrians, and cellular communication networks. Sidelink communication may further be utilized in other, non-vehicular proximity use cases. Examples of other proximity use cases may include smart wearables, public safety, or commercial based proximity services.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method for wireless communication at a first wireless communication device in a wireless communication network is disclosed. The method includes receiving an indication of quasi co-location (QCL) information representative of a large-scale channel property of a sidelink channel between the first wireless communication device and a second wireless communication device. The method further includes receiving a sidelink transmission over the sidelink channel from the second wireless communication device and processing the sidelink transmission based on the large-scale channel property of the sidelink channel.

Another example provides a first wireless communication device in a wireless communication network. The first wireless communication device includes a transceiver, a memory, and a processor coupled to the transceiver and the memory. The processor and the memory are configured to receive an indication of quasi co-location (QCL) information representative of a large-scale channel property of a sidelink channel between the first wireless communication device and a second wireless communication device via the transceiver. The processor and the memory are further configured to receive a sidelink transmission over the sidelink channel from the second wireless communication device via the transceiver and process the sidelink transmission based on the large-scale channel property of the sidelink channel.

Another example provides a method for wireless communication at a first wireless communication device in a wireless communication network. The method includes identifying quasi co-location (QCL) information for a sidelink transmission to be transmitted over a sidelink channel between the first wireless communication device and a second wireless communication device and transmitting an indication of the QCL information to the second wireless communication device. The indication of the QCL information is representative of a large-scale channel property of the sidelink channel. The method further includes transmitting the sidelink transmission over the sidelink channel to the second wireless communication device.

Another example provides a first wireless communication device in a wireless communication network. The first wireless communication device includes a transceiver, a memory, and a processor coupled to the transceiver and the memory. The processor and the memory are configured to identify quasi co-location (QCL) information for a sidelink transmission to be transmitted over a sidelink channel between the first wireless communication device and a second wireless communication device and transmit an indication of the QCL information to the second wireless communication device via the transceiver. The indication of the QCL information is representative of a large-scale channel property of the sidelink channel. The processor and the memory are further configured to transmit the sidelink transmission over the sidelink channel to the second wireless communication device via the transceiver.

These and other aspects will become more fully understood upon a review of the detailed description, which follows. Other aspects, features, and examples will become apparent to those of ordinary skill in the art, upon reviewing the following description of specific, exemplary examples of in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while exemplary examples may be discussed below as device, system, or method examples such exemplary examples can be implemented in various devices, systems, and methods.

DETAILED DESCRIPTION

Figure 1:
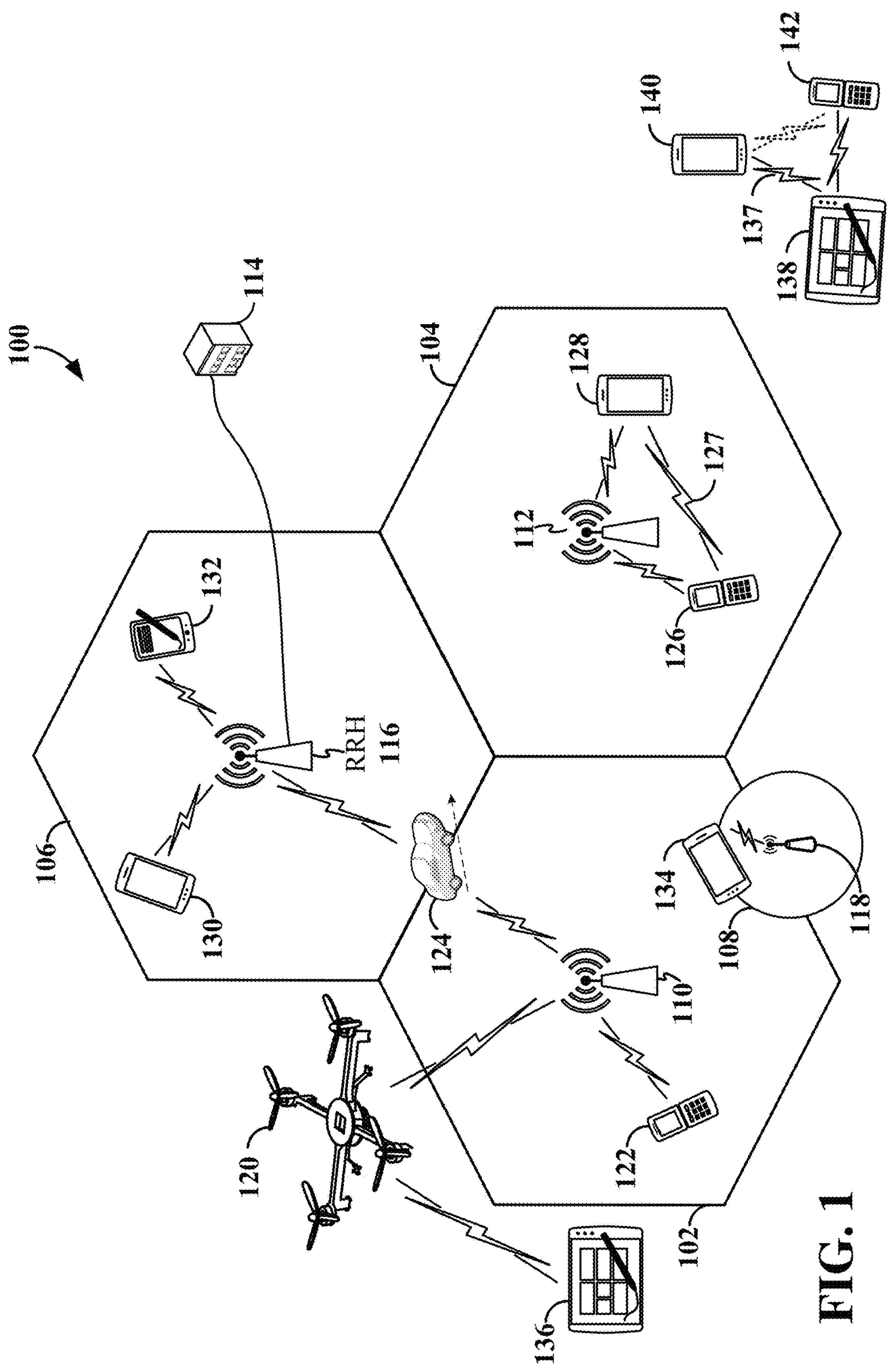
FIG. 1 is a diagram illustrating an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the disclosure relate to sidelink channel tracking using quasi co-location (QCL) information for a sidelink channel between wireless communication devices (e.g., UEs). A transmitting UE may identify QCL information for a sidelink transmission to a receiving UE over a sidelink channel and transmit an indication of the QCL information to the receiving UE. The indication of the QCL information may be representative of one or more large-scale channel properties (LSCPs) associated with the sidelink transmission. For example, the LSCPs may include time domain properties, such as an average delay and/or delay spread, frequency domain properties, such as a Doppler shift and/or Doppler spread, and/or spatial domain properties, such as a spatial receiving (Rx) parameter.

The receiving UE may then process the sidelink transmission based on the one or more LSCPs. For example, the receiving UE may identify a source identifier (ID) of the transmitting UE and utilize one or more LSCPs of the sidelink channel (e.g., as indicated by the QCL information) associated with the source ID to process the sidelink transmission. In some examples, the sidelink transmission includes a physical sidelink shared channel (PSSCH)

In some examples, the indication of the QCL information may include a sidelink transmission configuration indicator (TCI) state. In this example, the transmitting UE may transmit at least two TCI states to the receiving UE and select one of the TCI states for the sidelink transmission. The receiving UE may utilize the selected TCI state to identify the one or more LSCPs of the sidelink channel and process the sidelink transmission based on the one or more LSCPs. In other examples, the indication of the QCL information may include a QCL change indication that indicates whether there is a change in QCL information between the sidelink transmission and a previous sidelink transmission. The QCL change indication may be transmitted, for example, within second stage sidelink control information (SCI). In this example, the receiving UE may acquire new LSCP(s) of the sidelink channel based on the QCL change indication indicating a change in QCL information between the sidelink transmission and the previous sidelink transmission to process the sidelink transmission.

In some examples, the indication of the QCL information may be transmitted via SCI, a sidelink radio resource control (RRC) message or a sidelink medium access control (MAC) control element (MAC-CE). In examples in which the indication of the QCL information is transmitted via a sidelink RRC message or sidelink MAC-CE, the sidelink RRC message or sidelink MAC-CE may further include a time period after which the QCL information (e.g., a new TCI state or change in QCL information) becomes effective. The receiving UE may further transmit a confirmation RRC message or confirmation MAC-CE to the transmitting UE confirming reception of the indication of the QCL information.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to 3$^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
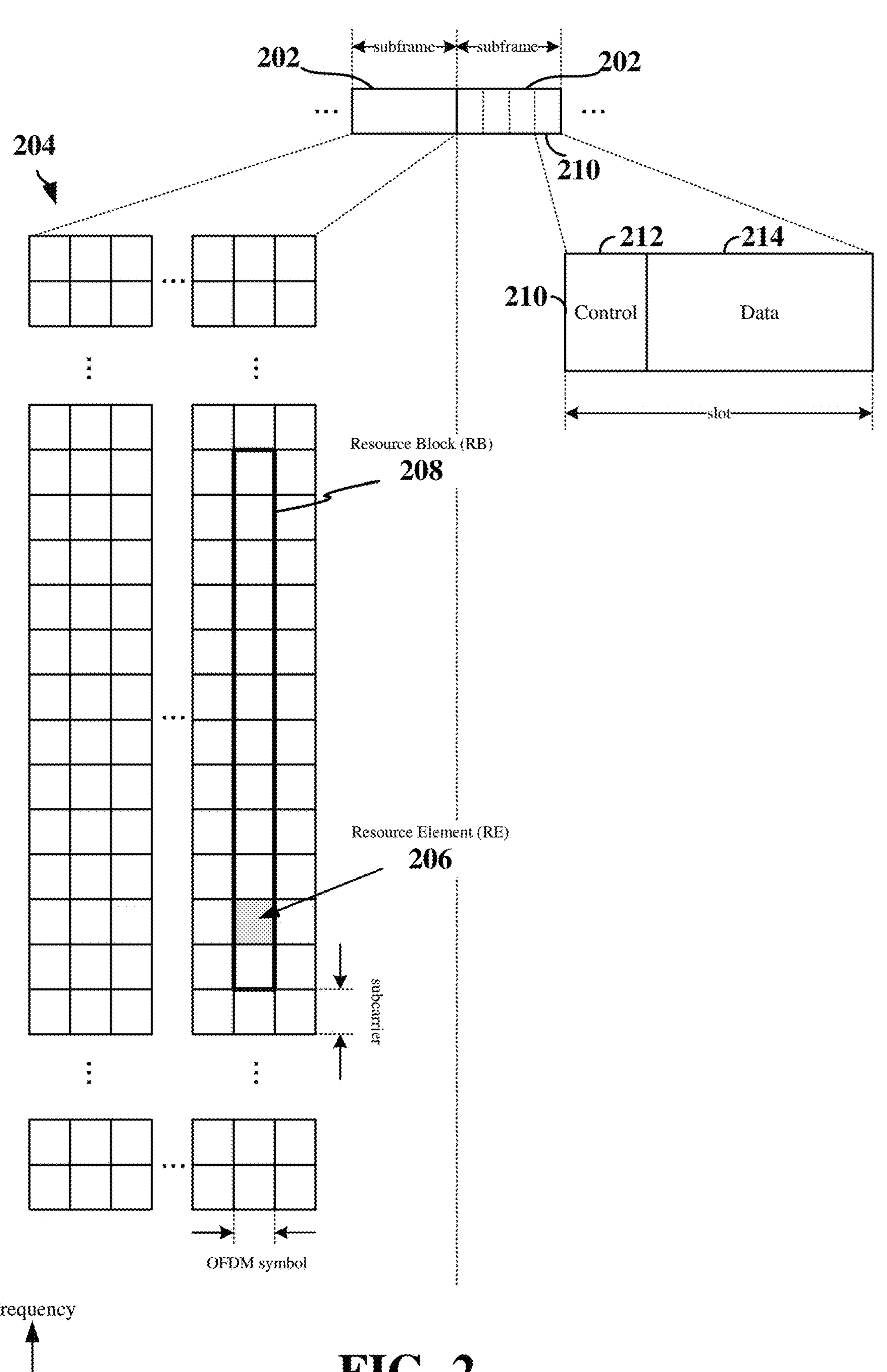
FIG. 2 is a diagram illustrating an example of a frame structure for use in a wireless communication network according to some aspects.

Referring now to FIG. 2, an expanded view of an exemplary subframe 202 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier x 1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 208 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs or sidelink devices (hereinafter collectively referred to as UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 12 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within a RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS); and a synchronization signal block (SSB). SSB s may be broadcast at regular intervals based on a periodicity (e.g., 5, 10, 20, 20, 80, or 120 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system)

bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESETO), a cell barred indicator, a cell reselection indicator, a raster offset, and a search space for SIB 1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 206 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIB s and DMRSs.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 210.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 2 are not necessarily all of the channels or carriers that may be utilized between devices, and those of ordinary skill in the art will recognize that other channels or carriers may be utilized in addition to those illustrated, such as other traffic, control, and feedback channels.

Figure 3:
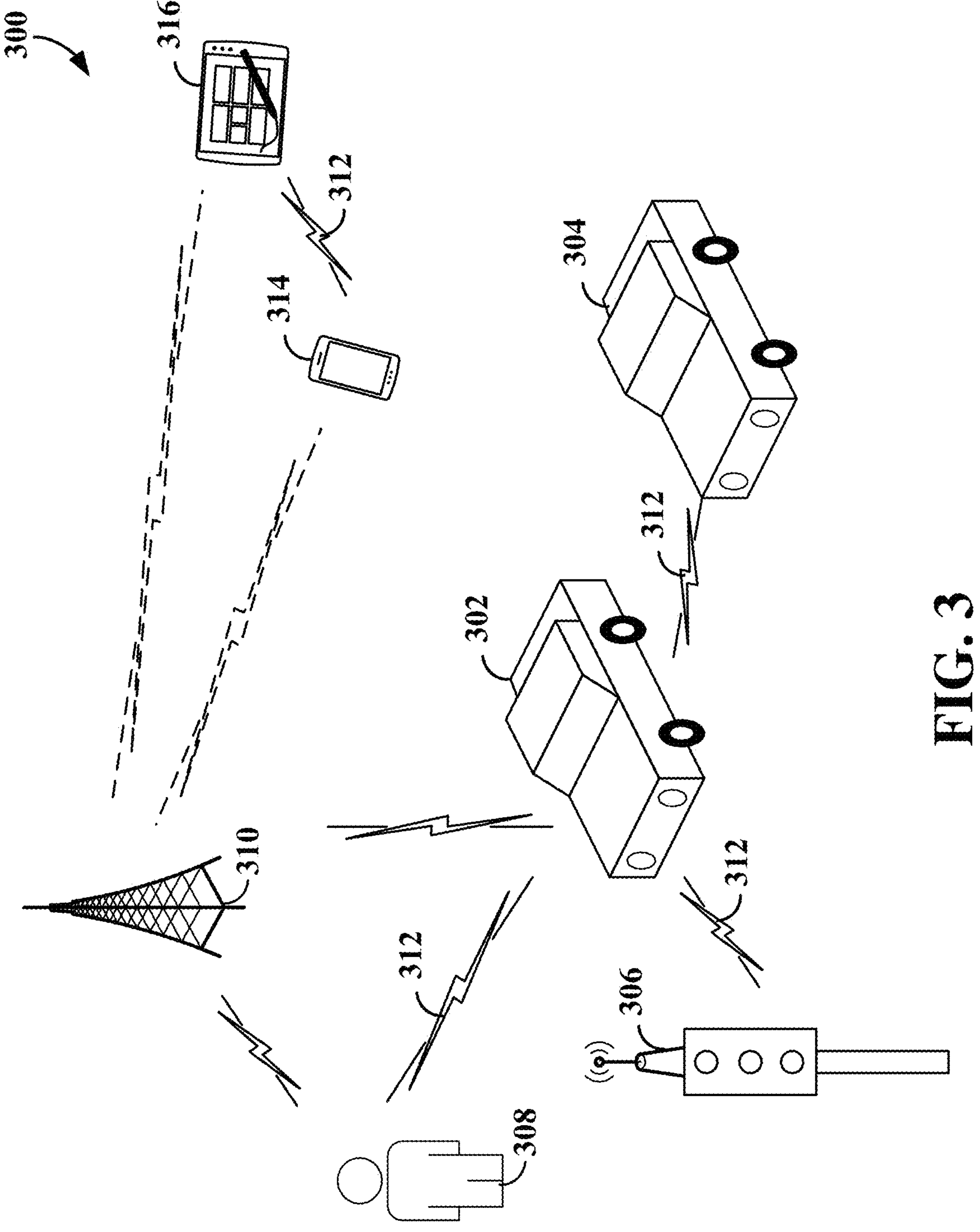
FIG. 3 is a diagram illustrating an example of a wireless communication network employing sidelink communication according to some aspects.

FIG. 3 illustrates an example of a wireless communication network 300 configured to support D2D or sidelink communication. In some examples, sidelink communication may include V2X communication. V2X communication involves the wireless exchange of information directly between not only vehicles (e.g., vehicles 302 and 304) themselves, but also directly between vehicles 302/304 and infrastructure (e.g., roadside units (RSUs) 306), such as streetlights, buildings, traffic cameras, tollbooths or other stationary objects, vehicles 302/304 and pedestrians 308, and vehicles 302/304 and wireless communication networks (e.g., base station 310). In some examples, V2X communication may be implemented in accordance with the New Radio (NR) cellular V2X standard defined by 3GPP, Release 16, or other suitable standard.

V2X communication enables vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc., in case of imminent danger.

The sidelink communication between vehicle-UEs (V-UEs) 302 and 304 or between a V-UE 302 or 304 and either an RSU 306 or a pedestrian-UE (P-UE) 308 may occur over a sidelink 312 utilizing a proximity service (ProSe) PC5 interface. In various aspects of the disclosure, the PC5 interface may further be utilized to support D2D sidelink 312 communication in other proximity use cases (e.g., other than V2X). Examples of other proximity use cases may include smart wearables, public safety, or commercial (e.g., entertainment, education, office, medical, and/or interactive) based proximity services. In the example shown in FIG. 3, ProSe communication may further occur between UEs 314 and 316.

ProSe communication may support different operational scenarios, such as in-coverage, out-of-coverage, and partial coverage. Out-of-coverage refers to a scenario in which UEs (e.g., UEs 314 and 316) are outside of the coverage area of a base station (e.g., base station 310), but each are still configured for ProSe communication. Partial coverage refers to a scenario in which some of the UEs (e.g., V-UE 304) are outside of the coverage area of the base station 310, while other UEs (e.g., V-UE 302 and P-UE 308) are in communication with the base station 310. In-coverage refers to a scenario in which UEs (e.g., V-UE 302 and P-UE 308) are in communication with the base station 310 (e.g., gNB) via a Uu (e.g., cellular interface) connection to receive ProSe service authorization and provisioning information to support ProSe operations.

To facilitate D2D sidelink communication between, for example, UEs 314 and 316 over the sidelink 312, the UEs 314 and 316 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 312. For example, the discovery signal may be utilized by the UE 316 to measure the signal strength and channel status of a potential sidelink (e.g., sidelink 312) with another UE (e.g., UE 314). The UE 316 may utilize the measurement results to select a UE (e.g., UE 314) for sidelink communication or relay communication.

In 5G NR sidelink, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. A radio resource control (RRC) configuration of the resource pools may be either pre-configured (e.g., a factory setting on the UE determined, for example, by sidelink standards or specifications) or configured by a base station (e.g., base station 310).

In addition, there may be two main resource allocation modes of operation for sidelink (e.g., PC5) communications. In a first mode, Mode 1, a base station (e.g., gNB) 310 may allocate resources to sidelink devices (e.g., V2X devices or other sidelink devices) for sidelink communication between the sidelink devices in various manners. For example, the base station 310 may allocate sidelink resources dynamically (e.g., a dynamic grant) to sidelink devices, in response to requests for sidelink resources from the sidelink devices. The base station 310 may further activate preconfigured sidelink grants (e.g., configured grants) for sidelink communication among the sidelink devices. In Mode 1, sidelink feedback may be reported back to the base station 310 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink is the same between the two modes. Therefore, from a receiver's point of view, there is no difference between the modes.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). SCI-1 may also include a physical sidelink shared channel (PSSCH) resource assignment and a resource reservation period (if enabled). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the format of the SCI-2. Here, the format indicates the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may also be transmitted on the PSCCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource.

Figures 4A, 4B:
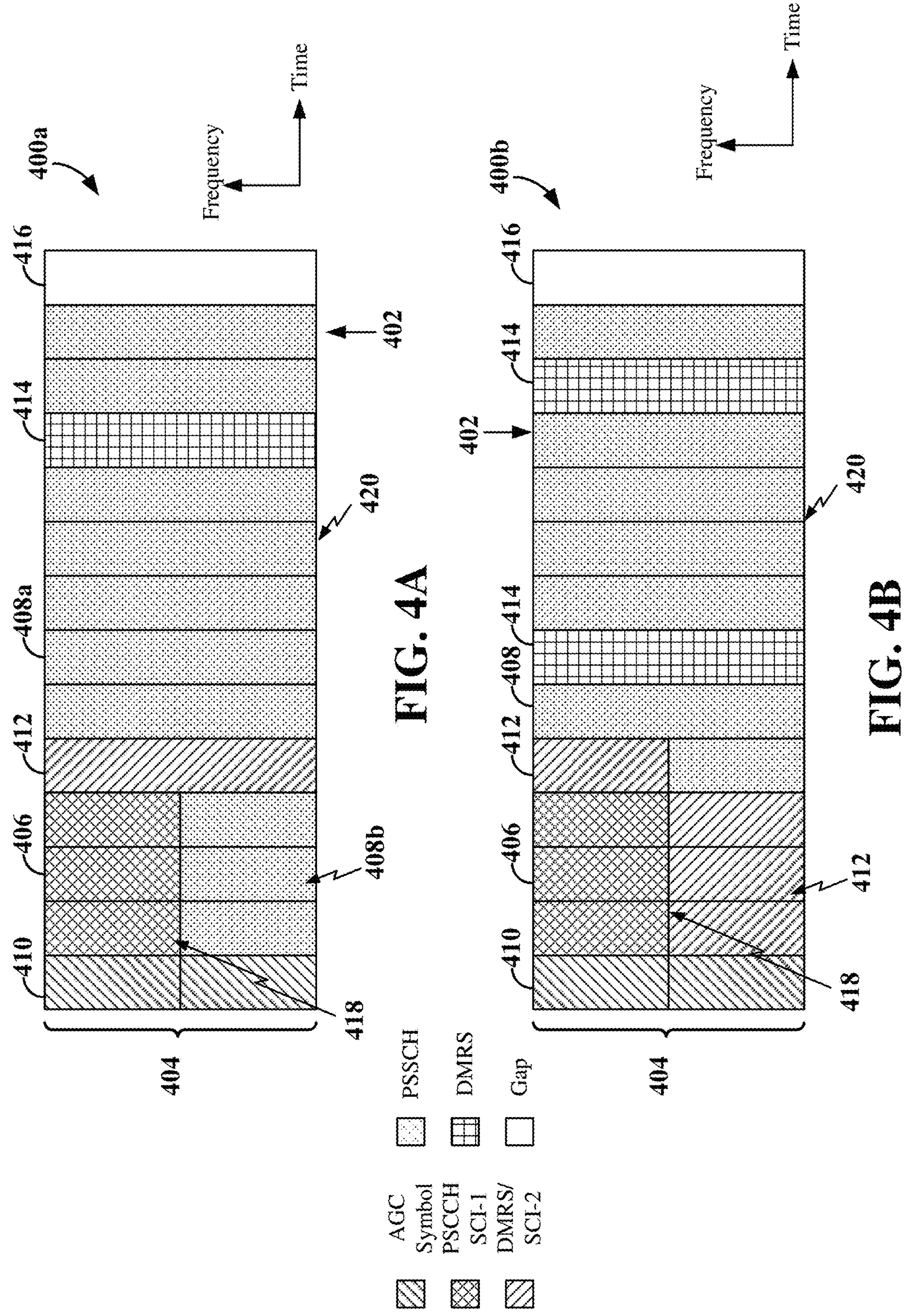
FIGS. 4A and 4B are diagrams illustrating examples of sidelink slot structures according to some aspects.

FIGS. 4A and 4B are diagrams illustrating examples of sidelink slot structures according to some aspects. The sidelink slot structures may be utilized, for example, in a V2X or other D2D network implementing sidelink. In the examples shown in FIGS. 4A and 4B, time is in the horizontal direction with units of symbols 402 (e.g., OFDM symbols); and frequency is in the vertical direction. Here, a carrier bandwidth 404 allocated for sidelink wireless communication is illustrated along the frequency axis. The carrier bandwidth 404 may include a plurality of sub-channels, where each sub-channel may include a configurable number of PRBs (e.g., 10, 14, 20, 24, 40, 44, or 100 PRBs).

Each of FIGS. 4A and 4B illustrate an example of a respective slot 400*a* or 400*b* including fourteen symbols 402 that may be used for sidelink communication. However, it should be understood that sidelink communication can be configured to occupy fewer than fourteen symbols in a slot 400*a* or 400*b*, and the disclosure is not limited to any particular number of symbols 402. Each sidelink slot 400*a* and 400*b* includes a physical sidelink control channel (PSCCH) 406 occupying a control region 418 of the slot 400*a* and 400*b* and a physical sidelink shared channel (PSSCH) 408 occupying a data region 420 of the slot 400*a* and 400*b*. The PSCCH 406 and PSSCH 408 are each transmitted on one or more symbols 402 of the slot 400*a*. The PSCCH 406 includes, for example, SCI-1 that schedules transmission of data traffic on time-frequency resources of the corresponding PSSCH 408. As shown in FIGS. 4A and 4B, the PSCCH 406 and corresponding PSSCH 408 are transmitted in the same slot 400*a* and 400*b*. In other examples, the PSCCH 406 may schedule a PSSCH in a subsequent slot.

In some examples, the PSCCH 406 duration is configured to be two or three symbols. In addition, the PSCCH 406 may be configured to span a configurable number of PRBs, limited to a single sub-channel. For example, the PSCCH 406 may span 10, 12, 14, 20, or 24 PRBs of a single sub-channel. A DMRS may further be present in every PSCCH symbol. In some examples, the DMRS may be placed on every fourth RE of the PSCCH 406. A frequency domain orthogonal cover code (FD-OCC) may further be applied to the PSCCH DMRS to reduce the impact of colliding PSCCH transmissions on the sidelink channel. For example, a transmitting UE may randomly select the FD-OCC from a set of pre-defined FD-OCCs. In each of the examples shown in FIGS. 4A and 4B, the starting symbol for the PSCCH 406 is the second symbol of the corresponding slot 400*a* or 400*b* and the PSCCH 406 spans three symbols 402.

The PSSCH 408 may be time-division multiplexed (TDMed) with the PSCCH 406 and/or frequency-division multiplexed (FDMed) with the PSCCH 406. In the example shown in FIG. 4A, the PSSCH 408 includes a first portion 408*a* that is TDMed with the PSCCH 406 and a second portion 408*b* that is FDMed with the PSCCH 406. In the example shown in FIG. 4B, the PSSCH 408 is TDMed with the PSCCH 406.

One and two layer transmissions of the PSSCH 408 may be supported with various modulation orders (e.g., QPSK, 16-QAM, 64-QAM and 246-QAM). In addition, the PSSCH 408 may include DMRSs 414 configured in a two, three, or four symbol DMRS pattern. For example, slot 400*a* shown in FIG. 4A illustrates a two symbol DMRS pattern, while slot 400*b* shown in FIG. 4B illustrates a three symbol DMRS pattern. In some examples, the transmitting UE can select the DMRS pattern and indicate the selected DMRS pattern in SCI-1, according to channel conditions. The DMRS pattern may be selected, for example, based on the number of PSSCH 408 symbols in the slot 400*a* or 400*b*. In addition, a gap symbol 416 is present after the PSSCH 408 in each slot 400*a* and 400*b*.

Each slot 400*a* and 400*b* further includes SCI-2 412 mapped to contiguous RBs in the PSSCH 408 starting from the first symbol containing a PSSCH DMRS. In the example shown in FIG. 4A, the first symbol containing a PSSCH DMRS is the fifth symbol occurring immediately after the last symbol carrying the PSCCH 406. Therefore, the SCI-2 412 is mapped to RBs within the fifth symbol. In the example shown in FIG. 4B, the first symbol containing a PSSCH DMRS is the second symbol, which also includes the PSCCH 406. In addition, the SCI-2/PSSCH DMRS 412 are shown spanning symbols two through five. As a result, the SCI-2/PSSCH DMRS 412 may be FDMed with the PSCCH 406 in symbols two through four and TDMed with the PSCCH 406 in symbol five.

The SCI-2 may be scrambled separately from the sidelink shared channel. In addition, the SCI-2 may utilize QPSK. When the PSSCH transmission spans two layers, the SCI-2 modulation symbols may be copied on (e.g., repeated on) both layers. The SCI-1 in the PSCCH 406 may be blind decoded at the receiving wireless communication device. However, since the format, starting location, and number of REs of the SCI-2 412 may be derived from the SCI-1, blind decoding of SCI-2 is not needed at the receiver (receiving UE).

In each of FIGS. 4A and 4B, the second symbol of each slot 400*a* and 400*b* is copied onto (repeated on) a first symbol 410 thereof for automatic gain control (AGC) settling. For example, in FIG. 4A, the second symbol containing the PSCCH 406 FDMed with the PSSCH 408*b* may be transmitted on both the first symbol and the second symbol. In the example shown in FIG. 4B, the second symbol containing the PSCCH 406 FDMed with the SCI-2/PSSCH DMRS 412 may be transmitted on both the first symbol and the second symbol.

Figure 5:
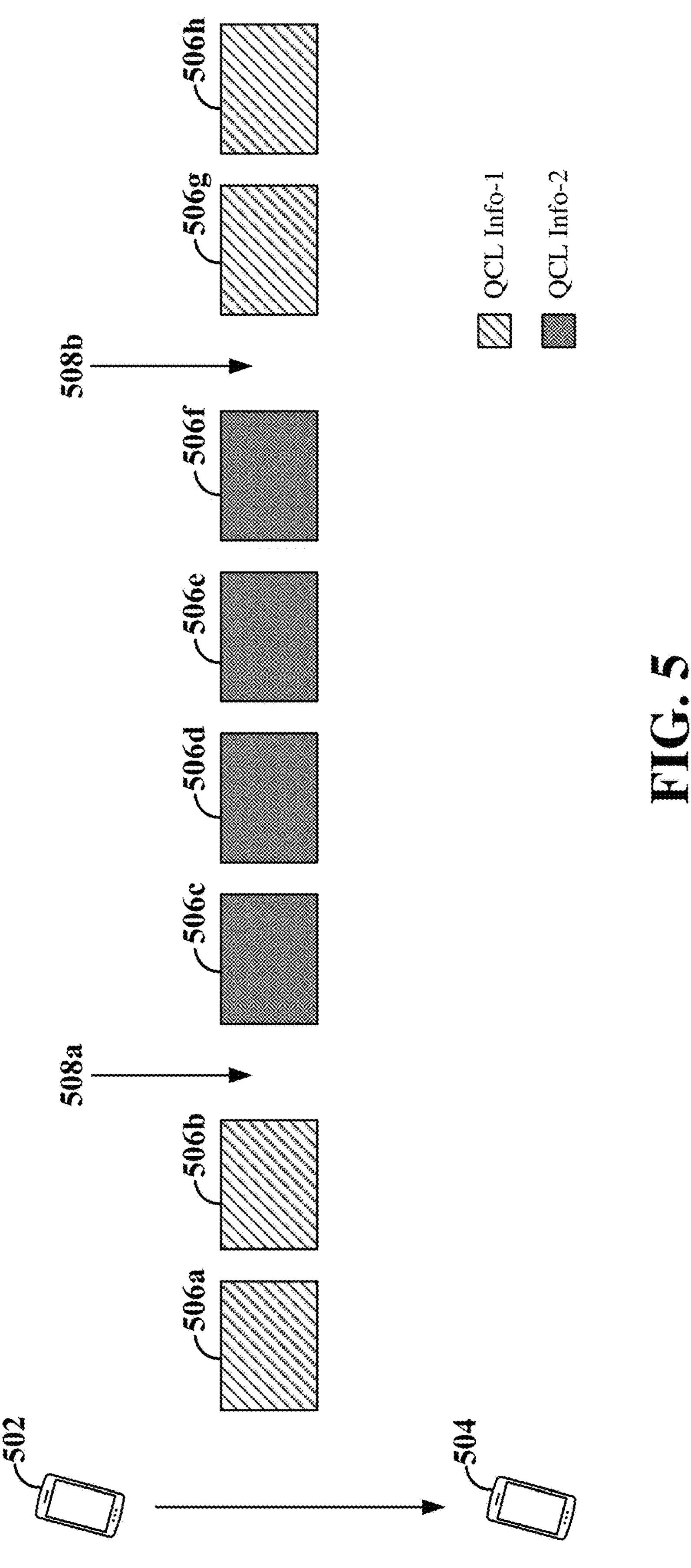
FIG. 5 is a diagram illustrating an example of sidelink transmissions between wireless communication devices according to some aspects.

FIG. 5 is a diagram illustrating an example of sidelink transmissions between wireless communication devices 502 and 504 according to some aspects. Each of the wireless communication devices 502 and 504 may be any of the UEs, sidelink devices, or scheduled entities shown in FIGS. 1 and/or 3.

Vehicular (e.g., V2X) applications may be characterized by high mobility and limited link/connection management at the physical (PHY) layer. For example, in V2X applications, channel estimation at the physical layer is performed by computing various channel parameters (e.g., channel coefficients) on the fly without relying on any prior information related to the large-scale channel properties (LSCPs) of the sidelink channel. Examples of LSCPs may include time-domain properties, such as Doppler shift and/or Doppler spread, frequency domain properties, such as average delay and/or delay spread, and/or spatial domain properties, such as the spatial receiving (Rx) parameter (e.g., beam).

Unlike cellular (e.g., Uu) links, there is currently no dedicated reference signal for sidelink UEs to perform channel tracking of the LSCPs. For example, in cellular networks, the SSB, CSI-RS, and/or PT-RS may be used by a UE to obtain the LSCPs (e.g., the second order statistics or channel profile) of the wireless channel, which may be later used for channel estimation (e.g., calculating the channel coefficients) on the DRMS. For example, each PDSCH may include a DMRS, and the base station may indicate the association between a particular RS and the DMRS of the PDSCH in order for the UE to locate the correct second order statistics (e.g., Doppler, delay spread, etc.). The association between the DMRS and the RS may be referred to herein as quasi co-location (QCL).

Two antenna ports may be considered to be QCL if the LSCPs of the channel over which a symbol on one antenna port is conveyed can be inferred from the channel on which a symbol on the other antenna port is conveyed. Four types of QCL are defined in 5G NR: QCL-TypeA; QCL-TypeB; QCL-TypeC; and QCL-TypeD. For example, QCL-TypeA may indicate a downlink reference signal (e.g., SSB or CSI-RS) from which the LSCPs of Doppler shift, Doppler spread, average delay, and/or delay spread of a downlink channel or signal may be inferred. QCL-TypeB and QCL-TypeC may also indicate downlink reference signals from which specific LSPCPs (e.g., Doppler shift and/or Doppler spread for QCL-TypeB and average delay and/or delay spread for QCL-TypeC) may be inferred. QCL-TypeD may indicate a spatial RX parameter (e.g., spatial property of the beam on which a downlink channel or signal is transmitted). The spatial property of the beam may be inferred from the beam utilized for transmission of a downlink reference signal and may indicate, for example, at least one of a beam direction or a beam width.

In some examples, the wireless communication devices (e.g., UEs) 502 and 504 may be communicating over a PC5 sidelink in a non-vehicular application. Non-vehicular sidelink applications may differ from V2X applications in that one or more of the UEs 502 and 504 may be in a static mode (e.g., stationary). In addition, the UEs 502 and 504 may engage in sidelink communication continuously over an extended period of time. As such, the sidelink transmission performance may be enhanced by utilizing prior information related to the sidelink channel. In particular, the sidelink channel estimation may be greatly improved if the receiving UE (e.g., UE 504) has knowledge of the large-scale channel properties (LSCPs) of the sidelink channel between the transmitting UE (e.g., UE 502) and the receiving UE 504. Thus, channel tracking of the sidelink channel may be facilitated at the receiving UE 504 based on the LSCPs of the sidelink channel.

However, as previously mentioned, QCL is not currently defined for sidelink communications, partially due to the high mobility nature of V2X applications. One option to enable channel tracking is by UE implementation. For example, UE 504 can track the LSCP(s) for the channel between UE 504 and UE 502 based on the source identifier (ID) of a sidelink transmission (e.g., packet) received from UE 502. However, the transmitting UE 502 may change the transmission characteristics, which may result in a change in the LSCP that the receiving UE 504 is unaware of. For example, the transmitting UE 502 may switch from one transmit antenna to another transmit antenna, which may change any of the LSCPs of the channel. For example, the transmitting UE 502 may switch transmit antennas for spatial diversity, to combat UE rotation or blockage, or based on a request by the base station to change the transmit antenna for sidelink SRS antenna switching (e.g., in Mode 1 sidelink applications). As another example, the transmitting UE 502 may implement small delay cyclic delay diversity (CDD), which may change the observed delay spread. As yet another example, for milli-meter wave applications, such as FR2 or higher frequency band, the transmitting UE 502 may switch the transmit beam, hence changing the spatial Rx parameter.

In various aspects of the disclosure, to facilitate channel tracking, the transmitting UE 502 may indicate QCL information (QCL-TypeA, TypeB, TypeC, and/or TypeD) to the receiving UE 504. For example, the transmitting UE 502 may transmit a plurality of sidelink transmissions 506*a*-506*h* to the receiving UE 504. A first set of sidelink transmissions 506*a* and 506*b* may be associated with first QCL information (QCL Info-1). In this example, sidelink transmissions 506*a* and 506*b* may be QCLed, whereas sidelink transmissions 506*a*-506*b* and sidelink transmissions 506*c*-506*f* may not be QCLed. At 508*a*, the QCL information may change from the first QCL information associated with sidelink transmissions 506*a* and 506*b* to second QCL information (QCL Info-2) for a second set of sidelink transmissions 506*c*-506*f*. For example, the transmitting UE 502 may change the transmit antenna, beam, and/or CDD utilized for the second set of sidelink transmissions 506*c*-506*f*.

The transmitting UE 502 may then transmit an indication of the QCL information to be utilized for the second set of sidelink transmissions 506*c*-506*f* to the receiving UE 504. For example, the indication of the QCL information may be transmitted via a sidelink radio resource control (RRC) message, a sidelink medium access control (MAC) control element (MAC-CE) or sidelink control information (SCI). In examples in which the indication of the QCL information is sent in the SCI, the indication of the QCL information may be transmitted within the sidelink grant of each sidelink transmission 506*c*-506*f*. For example, the SCI for each sidelink transmission 506*c*-506*f* may include the indication of the QCL information. In some examples, the indication of the SCI information may be transmitted within second stage SCI (SCI-2).

In examples in which the indication of the QCL information is transmitted in a sidelink RRC message or sidelink MAC-CE, the sidelink RRC message or sidelink MAC-CE may be transmitted prior to the first sidelink transmission (e.g., sidelink transmission 506*c*) to which the change in QCL information applies. In this example, the sidelink RRC message or sidelink MAC-CE may further include a time period (e.g., 3 ms for a sidelink MAC-CE or about 10 ms for a sidelink RRC message) after which the new QCL information becomes effective. Thus, the transmitting UE 502 may transmit the sidelink RRC message or sidelink MAC-CE prior to the sidelink transmission 506*c* by an amount equal to at least the time period. As such, the sidelink transmission 506*c* may be received by the receiving UE 504 after the indicated time period in the sidelink RRC message or sidelink MAC-CE. The receiving UE 504 may further transmit a confirmation RRC message or confirmation MAC-CE to the transmitting UE 502 to indicate reception of the QCL information.

At 508*b*, the QCL information may again change from the second QCL information associated with sidelink transmissions 506*c*-506*f* back to the first QCL information for a third set of sidelink transmissions 506*g* and 506*h*. For example, the transmitting UE 502 may change the transmit antenna, beam, and/or CDD utilized for the third set of sidelink transmissions 506*g* and 506*h*. The transmitting UE 502 may then transmit an indication of the QCL information to be utilized for the third set of sidelink transmissions 506*g* and 506*h* to the receiving UE 504.

In some examples, the indication of the QCL information may include a transmission configuration indicator (TCI) state. For example, the transmitting UE 502 may configure two or more TCI states on the receiving UE 504. Each TCI state includes QCL information (e.g., TypeA, TypeB, TypeC, and/or TypeD) from which the receiving UE 504 may locate the correct LSCPs for a particular sidelink transmission (e.g., PSSCH) from the transmitting UE 502. For example, the transmitting UE 502 may select a TCI state for a PSSCH (e.g., DMRS of a PSSCH) and transmit the selected TCI state to the receiving UE 504. The receiving UE 504 may then retrieve the LSCPs of the sidelink channel corresponding to the selected TCI state.

In this example, the receiving UE 504 may obtain and store the LSCPs associated with each TCI state utilizing a sidelink reference signal (SL-RS), such as a sidelink SSB, sidelink CSI-RS, sidelink DMRS, sidelink TRS, or sidelink PRS, associated with the respective TCI state. For example, the transmitting UE 502 may transmit a SL-RS and the receiving UE 504 may measure or identify the LSCPs of that SL-RS and store the LSCPs for that SL-RS. Upon receiving a TCI state for a sidelink DMRS/PSSCH, the receiving UE 504 may discern the SL-RS indicated in the TCI state (e.g., the SL-RS to be QCLed with the DMRS/PSSCH) and retrieve the LSCPs stored for that corresponding SL-RS. The receiving UE 504 may then use the retrieved LSCPs to estimate the sidelink channel (e.g., based on the DMRS) and process (e.g., demodulate and decode) the sidelink transmission using the sidelink channel estimate (e.g., channel coefficients).

In other examples, the indication of the QCL information may include a QCL change indication. For example, the transmitting UE 502 may transmit the QCL change indication to the receiving UE 504 to indicate whether or not the QCL information has changed between two consecutive sidelink transmissions (e.g., a next sidelink transmission and an immediately previous sidelink transmission). In some examples, the QCL change indication may include a single bit to indicate one of two QCL codepoints. The receiving UE 504 may then compare a newly received QCL change indication with the immediately prior QCL change indication to determine whether a QCL information change has occurred. For example, if the QCL change indication is toggled/changed (e.g., from 0 to 1 or 1 to 0), the receiving UE 504 may determine that the QCL state (e.g., QCL information) has been changed from the previous sidelink transmission(s).

In this example, the receiving UE 504 may estimate new LSCPs of the sidelink channel from the sidelink DMRS of one or more next sidelink transmissions (e.g., PSSCHs) and utilize the new LSCPs to process the one or more next PSSCHs. For example, upon receiving a QCL change indication that indicates the QCL information has changed from a previous PSSCH, the receiving UE 504 may obtain new LSCPs based on the next PSSCH (and optionally one or more subsequent PSSCHs), estimate the sidelink channel for each PSSCH based on the new LSCPs and the corresponding sidelink DMRS, and process each PSSCH based on the corresponding sidelink channel estimate. Thus, in the event of detecting a QCL change at the receiving UE 504, the receiving UE 504 cannot apply the LSCP obtained from a previous sidelink transmission from the transmitting UE 502 to the current sidelink transmission of the transmitting UE 504. Instead, the receiving UE 504 will need to start over and develop a new LSCP for the transmitting UE 504 over time (e.g., gradually) until the receiving UE 504 detects another QCL change.

In any of the above examples, the receiving UE 504 may further decode the SCI/PSCCH to obtain the source ID of the PSSCH (e.g., the source ID of the transmitting UE 502). The receiving UE 504 may utilize the source ID to locate the corresponding LSCPs (or acquire and store new LSCPs) for the sidelink channel between the transmitting UE 502 and receiving UE 504.

Figure 6:
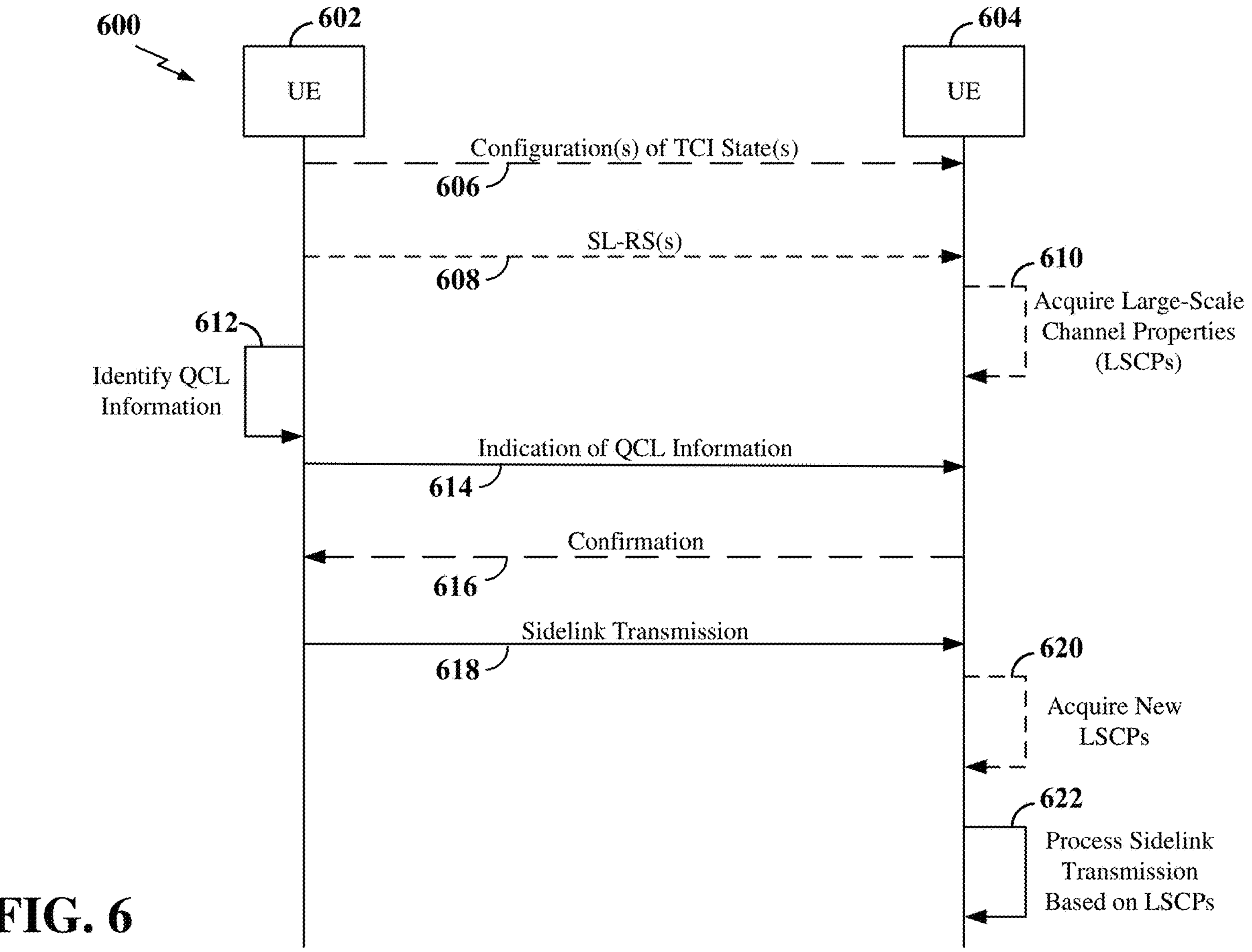
FIG. 6 is a signaling diagram illustrating exemplary signaling for sidelink channel tracking between wireless communication devices using QCL information according to some aspects.

FIG. 6 is a signaling diagram illustrating exemplary signaling for sidelink channel tracking between wireless communication devices 602 and 604 using QCL information according to some aspects. The wireless communication devices 602 and 604 may be any of the UEs, sidelink devices or scheduled entities shown in FIGS. 1, 3, and/or 5. In the example shown in FIG. 6, a first wireless communication device (e.g., wireless communication device 602) may be a transmitting UE and a second wireless communication device (e.g., wireless communication device 604) may be a receiving UE.

At 606, the transmitting UE 602 may optionally transmit respective configurations of at least two TCI states to the receiving UE 604. For example, the transmitting UE 602 may transmit a respective RRC configuration (e.g., a PC5-RRC configuration) of each of the TCI states to the receiving UE 604. Each TCI state includes QCL information for one or more QCL types. Each QCL type indicates a SL-RS to be utilized for that QCL type. As an example, a first TCI state may include first QCL-TypeA information indicating a first sidelink SSB to be utilized for channel estimation and first QCL-TypeD information indicating a first sidelink CSI-RS to be utilized for beamforming. As another example, a second TCI state may include second QCL-TypeA information indicating a second sidelink CSI-RS to be utilized for channel information and second QCL-TypeD information indicating the same second CSI-RS to be utilized for beamforming.

At 608, the transmitting UE 602 may optionally transmit one or more SL-RSs to the receiving UE 604. The SL-RSs may include, for example, a DMRS embedded in a PSSCH or a dedicated SL-RS (e.g., a SL CSI-RS, SL TRS, etc.). Each SL-RS may be transmitted using, for example, a particular transmit antenna, a particular transmit beam, and/or a particular CDD configuration. At 610, the receiving UE 604 may optionally acquire one or more LSCPs of the respective sidelink channel associated with one or more of the SL-RSs. For example, the receiving UE 604 may obtain a first set of LSCPs of the sidelink channel associated with one or more SL-RSs and a second set of LSCPs of the sidelink channel associated with one or more SL-RS s. The receiving UE 604 may further store the LSCPs obtained for each SL-RS.

At 612, the transmitting UE 602 may identify QCL information associated with a sidelink transmission (e.g., a next sidelink transmission to be transmitted from the transmitting UE 602 to the receiving UE 604). For example, the transmitting UE 602 may determine that the sidelink transmission is QCLed with one or more SL-RSs, each associated with a particular QCL type.

At 614, the transmitting UE 602 may transmit an indication of the QCL information to the receiving UE 604. In some examples, the indication of the QCL information may include a TCI state. For example, the transmitting UE 602 may select a TCI state for the sidelink transmission (e.g., a PSSCH) from the two or more TCI states configured for the receiving UE 604 and transmit the selected TCI state to the receiving UE 604. In other examples, the indication of the QCL information may include a QCL change indication. For example, the transmitting UE 602 may transmit the QCL change indication to the receiving UE 604 to indicate whether or not the QCL information has changed between the sidelink transmission and a previous sidelink transmission. The indication of the QCL information may be transmitted, for example, via a sidelink radio resource control (RRC) message, a sidelink medium access control (MAC) control element (MAC-CE) or sidelink control information (SCI).

At 616, in examples in which the indication of the QCL information is transmitted via a sidelink RRC message or sidelink MAC-CE, the receiving UE 604 may optionally transmit a confirmation RRC message or confirmation MAC-CE to the transmitting UE 602 confirming reception of the indication of the QCL information.

At 618, the transmitting UE 602 may transmit the sidelink transmission (e.g., PSSCH) to the receiving UE 604. Since the indication of the QCL information is representative of at least one LSCP of the sidelink channel on which the sidelink transmission is transmitted, the receiving UE 604 may identify or obtain the LSCP(s) of the sidelink channel associated with the sidelink transmission based on the indication of the QCL information. For example, the receiving UE 604 may retrieve previously stored LSCP(s) for the sidelink transmission based on the received TCI state. As another example, at 620, the receiving UE 604 may optionally acquire new LSCPs based on the QCL change indication. For example, if the QCL change indication indicates a change in QCL information from the previous sidelink transmission, the receiving UE 604 may estimate new LSCPs of the sidelink channel from the sidelink DMRS of the sidelink transmission (and optionally one or more subsequent sidelink transmissions that are associated with the same QCL information). In this example, the receiving UE 604 may buffer the sidelink transmission(s) while acquiring the new LSCP(s).

At 622, the receiving UE 604 may process the sidelink transmission based on the retrieved or acquired LSCP(s) associated with the indication of the QCL information. For example, the receiving UE 604 may use the LSCPs to estimate the sidelink channel (e.g., based on the DMRS of the sidelink transmission) and process (e.g., demodulate and decode) the sidelink transmission using the sidelink channel estimate (e.g., the channel coefficients).

Figure 7:
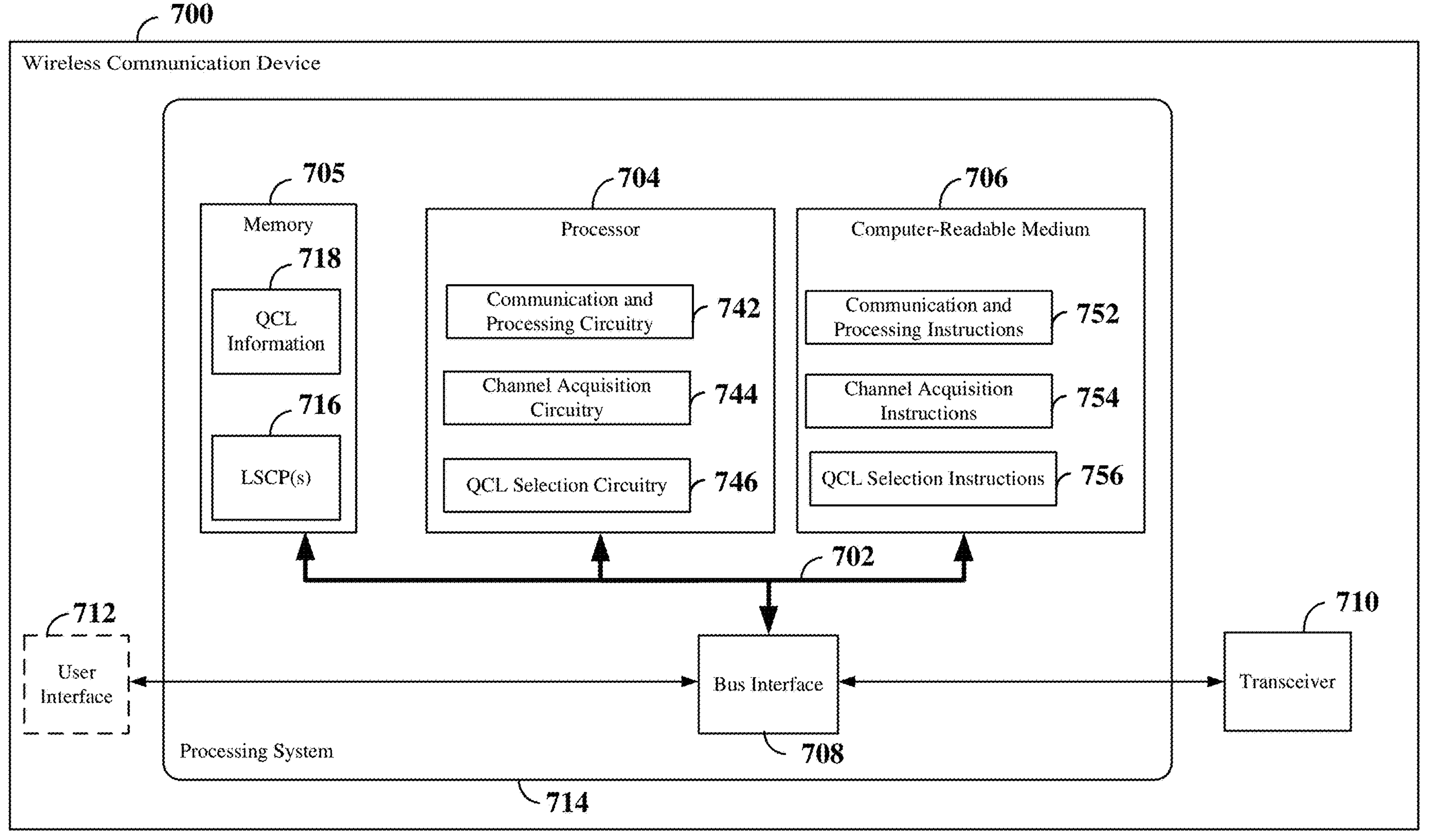
FIG. 7 is a block diagram illustrating an example of a hardware implementation for a wireless communication device employing a processing system according to some aspects.

FIG. 7 is a block diagram illustrating an example of a hardware implementation for a wireless communication device 700 employing a processing system 714. For example, the wireless communication device 700 may correspond to a sidelink device, such as a V2X device, D2D device or other UE or wireless communication device configured for sidelink communication, as shown and described above in reference to FIGS. 1, 3, 4, 6A-6C, 9, and/or 11.

The wireless communication device 700 may be implemented with a processing system 714 that includes one or more processors 704. Examples of processors 704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 700 may be configured to perform any one or more of the functions described herein. That is, the processor 704, as utilized in the wireless communication device 700, may be used to implement any one or more of the processes and procedures described below.

The processor 704 may in some instances be implemented via a baseband or modem chip and in other implementations, the processor 704 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 714 may be implemented with a bus architecture, represented generally by the bus 702. The bus 702 may include any number of interconnecting buses and bridges depending on the specific application of the processing system 714 and the overall design constraints. The bus 702 links together various circuits including one or more processors (represented generally by the processor 704), a memory 705, and computer-readable media (represented generally by the computer-readable medium 706). The bus 702 may also link various other circuits such as timing sources, peripherals, voltage regulators, and power management circuits, which are well known in the art, and therefore, will not be described any further.

A bus interface 708 provides an interface between the bus 702 and a transceiver 710. The transceiver 710 provides a communication interface or a means for communicating with various other apparatus over a transmission medium (e.g., air interface). Depending upon the nature of the apparatus, a user interface 712 (e.g., keypad, display, touch screen, speaker, microphone, control knobs, etc.) may also be provided. Of course, such a user interface 712 is optional, and may be omitted in some examples.

The processor 704 is responsible for managing the bus 702 and general processing, including the execution of software stored on the computer-readable medium 706. The software, when executed by the processor 704, causes the processing system 714 to perform the various functions described below for any particular apparatus. The computer-readable medium 706 and the memory 705 may also be used for storing data that is manipulated by the processor 704 when executing software. For example, the memory 705 may store large-scale channel properties (LSCPs) 716 and sidelink transmission configuration indicator (TCI) states 718 used by the processor 704 in processing sidelink transmissions.

One or more processors 704 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 706.

The computer-readable medium 706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 706 may reside in the processing system 714, external to the processing system 714, or distributed across multiple entities including the processing system 714. The computer-readable medium 706 may be embodied in a computer program product. By way of example, a computer program product may include a computer-readable medium in packaging materials. In some examples, the computer-readable medium 706 may be part of the memory 705. Those skilled in the art will recognize how best to implement the described functionality presented throughout this disclosure depending on the particular application and the overall design constraints imposed on the overall system.

In some aspects of the disclosure, the processor 704 may include circuitry configured for various functions. For example, the processor 704 may include communication and processing circuitry 742, configured to communicate with one or more sidelink devices (e.g., other UEs) via respective sidelinks (e.g., PC5 interfaces). In addition, the communication and processing circuitry 742 may be configured to communicate with a base station (e.g., gNB or eNB) via a Uu link. In some examples, the communication and processing circuitry 742 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 742 may include one or more transmit/receive chains.

In some implementations where the communication involves receiving information, the communication and processing circuitry 742 may obtain information from a component of the wireless communication device 700 (e.g., from the transceiver 710 that receives the information via radio frequency signaling or some other type of signaling suitable for the applicable communication medium), process (e.g., decode) the information, and output the processed information. For example, the communication and processing circuitry 742 may output the information to another component of the processor 704, to the memory 705, or to the bus interface 708. In some examples, the communication and processing circuitry 742 may receive one or more of signals, messages, other information, or any combination thereof. In some examples, the communication and processing circuitry 742 may receive information via one or more channels. In some examples, the communication and processing circuitry 742 may include functionality for a means for receiving. In some examples, the communication and processing circuitry 742 may include functionality for a means for processing, including a means for demodulating, a means for decoding, etc.

In some implementations where the communication involves sending (e.g., transmitting) information, the communication and processing circuitry 742 may obtain information (e.g., from another component of the processor 704, the memory 705, or the bus interface 708), process (e.g., modulate, encode, etc.) the information, and output the processed information. For example, the communication and processing circuitry 742 may output the information to the transceiver 710 (e.g., that transmits the information via radio frequency signaling or some other type of signaling suitable for the applicable communication medium). In some examples, the communication and processing circuitry 742 may send one or more of signals, messages, other information, or any combination thereof. In some examples, the communication and processing circuitry 742 may send information via one or more channels. In some examples, the communication and processing circuitry 742 may include functionality for a means for sending (e.g., a means for transmitting). In some examples, the communication and processing circuitry 742 may include functionality for a means for generating, including a means for modulating, a means for encoding, etc.

In some examples, the communication and processing circuitry 742 may be configured to receive an indication of quasi co-location (QCL) information representative of a large-scale channel property (LSCP) 716 of a sidelink channel between the wireless communication device (e.g., a receiving UE) and another wireless communication device (e.g., a transmitting UE). The LSCP(s) 716 of the sidelink channel may be stored, for example, in memory 705. The communication and processing circuitry 742 may be configured to receive the indication of the QCL information via a sidelink radio resource control (RRC) message, a sidelink medium access control (MAC) control element (MAC-CE), or sidelink control information (SCI). In some examples, the communication and processing circuitry 742 may further be configured to transmit a confirmation RRC message or a confirmation MAC-CE to the transmitting UE confirming receipt of the indication of the QCL information.

In some examples, the indication of the QCL information may include a sidelink transmission configuration indicator (TCI) state. In this example, the communication and processing circuitry 742 may further be configured to receive respective configurations of at least two sidelink TCI states from the transmitting UE. In addition, the communication and processing circuitry 742 may further store the TCI state(s) 718 within, for example, memory 705. In some examples, the indication of the QCL information may include a QCL change indication. In this example, the communication and processing circuitry 742 may be configured to receive the QCL change information within second stage SCI.

In some examples, the communication and processing circuitry 742 may further be configured to receive a sidelink transmission (e.g., a PSSCH) from the transmitting UE. In some examples, the sidelink RRC message or sidelink MAC-CE including the indication of the QCL information may further include a time period after which the QCL information becomes effective. In this example, the communication and processing circuitry 742 may be configured to receive the sidelink transmission from the transmitting UE after the time period. The communication and processing circuitry 742 may further be configured to process the sidelink transmission based on the LSCP 716 of the sidelink channel. For example, the communication and processing circuitry 742 may be configured to identify a source identifier (ID) of the transmitting UE associated with the sidelink transmission and utilize the LSCP 716 of the sidelink channel associated with the source ID to process the sidelink transmission. In some examples, the communication and processing circuitry 742 may be configured to utilize the source ID to locate and retrieve the LSCP 716 from memory 705 for processing of the sidelink transmission.

In examples in which the wireless communication device is a transmitting wireless communication device (e.g., transmitting UE), the communication and processing circuitry 742 may be configured to transmit the indication of the QCL information representative of the LSCP of the sidelink channel to a receiving wireless communication device (e.g., receiving UE). The communication and processing circuitry 742 may be configured to transmit the indication of the QCL information via a sidelink RRC message, a sidelink MAC-CE, or SCI. In some examples, the communication and processing circuitry 742 may further be configured to receive a confirmation RRC message or a confirmation MAC-CE from the receiving UE confirming receipt of the indication of the QCL information.

In examples in which the indication of the QCL information includes a sidelink TCI state, the communication and processing circuitry 742 may further be configured to transmit respective configurations of at least two sidelink TCI states to the receiving UE. In examples in which the indication of the QCL information includes a QCL change indication, the communication and processing circuitry 742 may be configured to transmit the QCL change information within second stage SCI.

The communication and processing circuitry 742 may further be configured to transmit a sidelink transmission (e.g., a PSSCH) to the receiving UE. In examples in which the sidelink RRC message or sidelink MAC-CE including the indication of the QCL information further includes a time period after which the QCL information becomes effective, the communication and processing circuitry 742 may be configured to transmit the sidelink transmission from the transmitting UE after the time period. The communication and processing circuitry 742 may further be configured to execute communication and processing instructions (software) 752 stored in the computer-readable medium 706 to implement one or more of the functions described herein.

The processor 704 may further include channel acquisition circuitry 744, configured to acquire the LSCP(s) 716 of a sidelink channel between the wireless communication device (e.g., the receiving UE) and another wireless communication device (e.g., the transmitting UE). The LSCP(s) 716 of the sidelink channel can include one or more of a time domain property, a frequency domain property, or a spatial domain property. In some examples, the channel acquisition circuitry 744 may be configured to acquire the LSCP(s) 716 of the sidelink channel utilizing one or more sidelink reference signals (SL-RSs). For example, the channel acquisition circuitry 744 may acquire one or more LSCP(s) 716 of the sidelink channel associated with the one or more SL-RSs.

The channel acquisition circuitry 744 may further store the acquired LSCP(s) 716 within, for example, memory 705.

The channel acquisition circuitry 744 may further store additional LSCPs 716 (e.g., for other sidelink channels between the transmitting UE and the receiving UE 700 and/or between the receiving UE 700 and other transmitting UEs) acquired based on one or more additional SL-RSs within the memory 705. Each LSCP 716 may be associated with a particular source ID (e.g., a transmitting UE) within the memory 705. In addition, each LSCP 716 may be associated with a particular SL-RS (e.g., a SL-RS index) within the memory 705. Furthermore, each LSCP 716 may be associated with one or more TCI states 718 stored in the memory 705. For example, each TCI state 718 may include one or more QCL types, each including a particular SL-RS index that may be utilized by the communication and processing circuitry 742 to index into the LSCPs 716 to retrieve the correct LSCP(s) 716 for a selected TCI state for a sidelink transmission from a particular source ID.

In some examples, the channel acquisition circuitry 744 may acquire the LSCP(s) 716 of the sidelink channel over time based on one or more sidelink transmissions (e.g., DMRS/PSSCH). In this example, the channel acquisition circuitry 744 may further store the acquired LSCP(s) 716 in the memory 705 and associate the acquired LSCP(s) 716 with a particular source ID. The channel acquisition circuitry 744 may then retrieve the LSCP(s) 716 for the sidelink transmission based on the corresponding source ID.

The channel acquisition circuitry 744 may further acquire small-scale channel properties (SSCPs), such as the channel coefficients, for the sidelink channel. For example, the channel acquisition circuitry 744 may operate together with the communication and processing circuitry 742 to obtain a channel estimate (e.g., SSCPs) of the sidelink channel based on the retrieved LSCPs 716 and the sidelink transmission (e.g., DMRS/PSSCH). The communication and processing circuitry 742 may further process the sidelink transmission based on the channel estimate. The channel acquisition circuitry 744 may further be configured to execute channel acquisition instructions (software) 754 stored in the computer-readable medium 706 to implement one or more of the functions described herein.

The processor 704 may further include QCL selection circuitry 746, configured to select or identify QCL information for a next sidelink transmission from the wireless communication device (e.g., the transmitting UE) to a receiving UE. For example, the QCL selection circuitry 746 may be configured to compare the QCL information for the next sidelink transmission (e.g., the selected transmit antenna, selected beam, and/or selected CDD configuration for the next sidelink transmission) to previous QCL information utilized for the previous sidelink transmission. The QCL selection circuitry 746 may then be configured to generate a QCL change indication and provide the QCL change indication to the communication and processing circuitry 742 for communication to the receiving UE. In some examples, the QCL change indication may include a value of a bit to be included in second stage SCI.

As another example, the QCL selection circuitry 746 may be configured to select a particular TCI state for the next sidelink transmission and to provide the selected TCI state to the communication and processing circuitry 742 for communication to the receiving UE. In this example, the QCL selection circuitry 746 may further be configured to configure two or more TCI states for the receiving UE and to provide the respective configurations of each of the two or more TCI states to the communication and processing circuitry 742 for communication to the receiving UE. The QCL selection circuitry 746 may further be configured to execute QCL selection instructions (software) 756 stored in the computer-readable medium 706 to implement one or more of the functions described herein.

Figure 8:
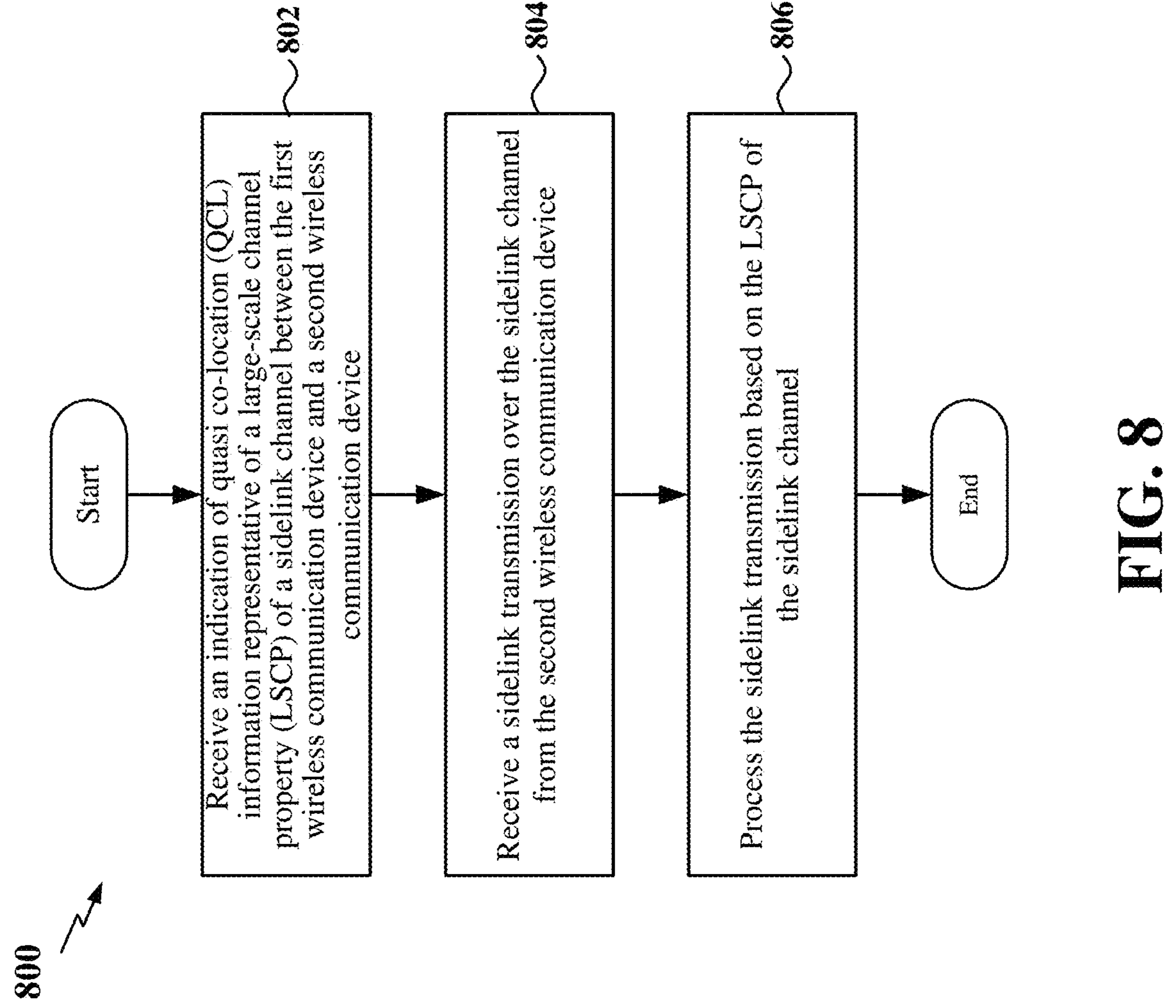
FIG. 8 is a flow chart of an exemplary method for sidelink channel tracking according to some aspects.

FIG. 8 is a flow chart 800 of an exemplary method for sidelink channel tracking according to some aspects. As described below, some or all illustrated features may be omitted in a particular implementation within the scope of the present disclosure, and some illustrated features may not be required for implementation of all examples. In some examples, the method may be performed by the wireless communication device 700, as described above and illustrated in FIG. 7, by a processor or processing system, or by any suitable means for carrying out the described functions.

At block 802, the wireless communication device (e.g., a first wireless communication device configured for sidelink communication) may receive an indication of quasi co-location (QCL) information representative of a large-scale channel property (LSCP) of a sidelink channel between the first wireless communication device and a second wireless communication device. In some examples, the indication of the QCL information includes a sidelink transmission configuration indicator (TCI) state. In some examples, the indication of the QCL information includes a QCL change indication. In some examples, the first wireless communication device may receive the indication of the QCL information via a sidelink radio resource control (RRC) message or a sidelink medium access control (MAC) control element (MAC-CE). In some examples, the first wireless communication device may receive the indication of the QCL information via sidelink control information (SCI). For example, the communication and processing circuitry 742 and transceiver 710, shown and described above in connection with FIG. 7, may provide a means to receive the indication of the QCL information.

At block 804, the first wireless communication device may receive a sidelink transmission over the sidelink channel from the second wireless communication device. In some examples, the sidelink RRC message or sidelink MAC-CE including the indication of the QCL information may further include a time period after which the QCL information becomes effective. In this example, the first wireless communication device may receive the sidelink transmission after the time period. For example, the communication and processing circuitry 742 and transceiver 710, shown and described above in connection with FIG. 7, may provide a means to receive the sidelink transmission.

At block 806, the first wireless communication device may process the sidelink transmission based on the LSCP of the sidelink channel. In some examples, the first wireless communication device may identify a source identifier (ID) of the second wireless communication device associated with the sidelink transmission and utilize the LSCP of the sidelink channel associated with the source ID to process the sidelink transmission. In some examples, the sidelink transmission is a physical sidelink shared channel (PSSCH). In examples in which the indication of the QCL information includes a QCL change indication, the first wireless communication device may acquire the LSCP of the sidelink channel based on the QCL change indication indicating a change in QCL information between the sidelink transmission and a previous sidelink transmission. In some examples, the LSCP includes one or more of a time domain property, a frequency domain property, or a spatial domain property. For example, the communication and processing circuitry 742 together with the channel acquisition circuitry 744, shown and described above in connection with FIG. 7, may provide a means to process the sidelink transmission.

Figure 9:
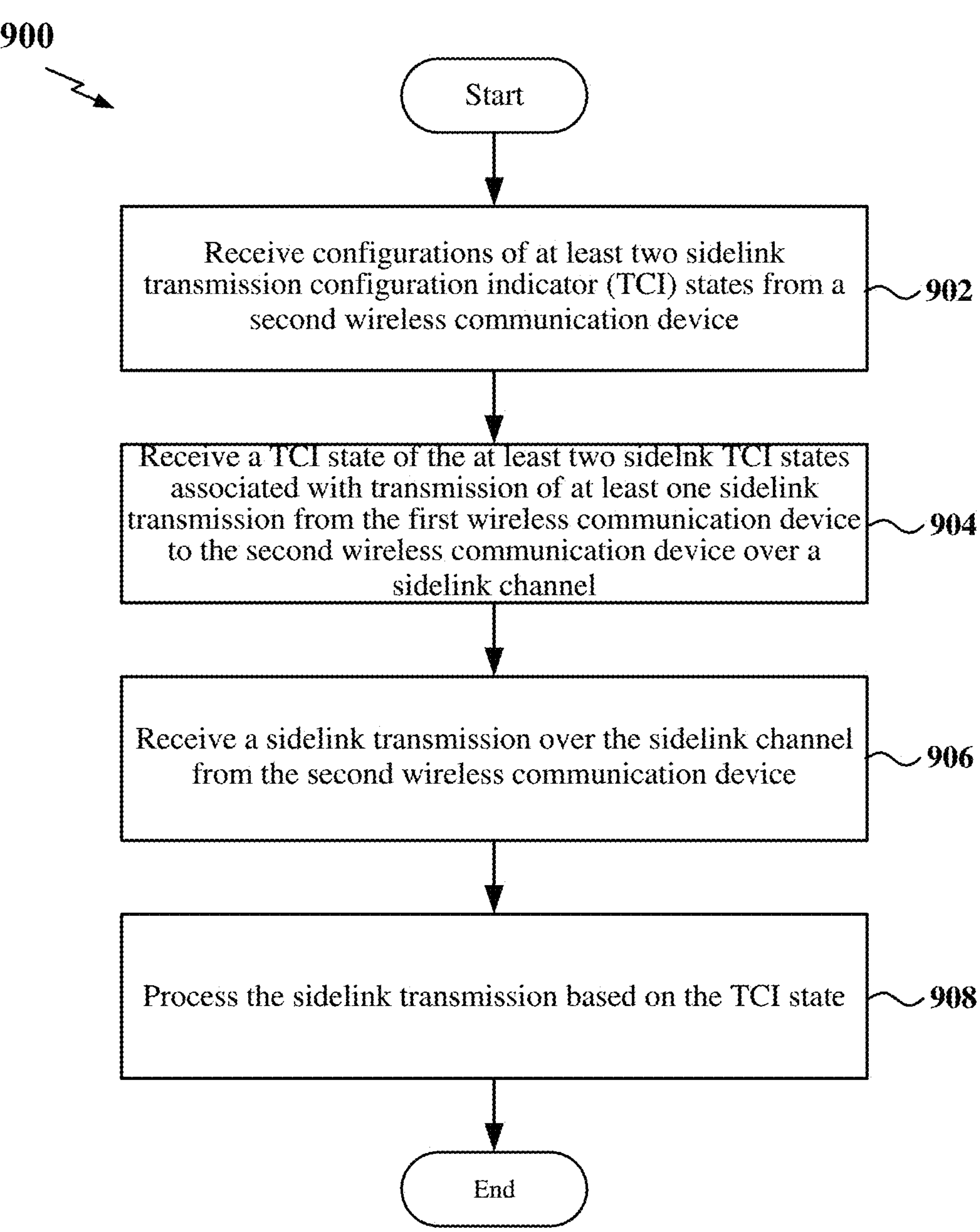
FIG. 9 is a flow chart of another exemplary method for sidelink channel tracking according to some aspects.

FIG. 9 is a flow chart 900 of another exemplary method for sidelink channel tracking according to some aspects. As described below, some or all illustrated features may be omitted in a particular implementation within the scope of the present disclosure, and some illustrated features may not be required for implementation of all examples. In some examples, the method may be performed by the wireless communication device 700, as described above and illustrated in FIG. 7, by a processor or processing system, or by any suitable means for carrying out the described functions.

At block 902, the wireless communication device (e.g., a first wireless communication device configured for sidelink communication) may receive configurations of at least two sidelink transmission configuration indicator (TCI) states from a second wireless communication device. Each TCI state may include QCL information for one or more QCL types. The QCL information for each QCL type may include, for example, a SL-RS index. For example, the communication and processing circuitry 742 and transceiver 710, shown and described above in connection with FIG. 7, may provide a means to receive TCI states.

At block 904, the wireless communication device may receive a TCI state of the at least two sidelink TCI states associated with transmission of at least one sidelink transmission from the first wireless communication device to a second wireless communication device over a sidelink channel. In some examples, the first wireless communication device may receive the TCI state via a sidelink radio resource control (RRC) message or a sidelink medium access control (MAC) control element (MAC-CE). In some examples, the first wireless communication device may receive the TCI state via sidelink control information (SCI). The TCI state may be representative of a large-scale channel property (LSCP) of the sidelink channel over which the at least one sidelink transmission may be received. For example, the communication and processing circuitry 742 and transceiver 710, shown and described above in connection with FIG. 7, may provide a means to receive the selected TCI state for the sidelink transmission.

At block 906, the first wireless communication device may receive a sidelink transmission over the sidelink channel from the second wireless communication device. In some examples, the sidelink RRC message or sidelink MAC-CE including the TCI state may further include a time period after which the TCI state becomes effective. In this example, the first wireless communication device may receive the sidelink transmission after the time period. For example, the communication and processing circuitry 742 and transceiver 710, shown and described above in connection with FIG. 7, may provide a means to receive the sidelink transmission.

At block 908, the first wireless communication device may process the sidelink transmission based on the TCI state. In some examples, the TCI state may indicate one or more LSCPs to utilize in processing the sidelink transmission. For example, the LSCP(s) may be stored within the first wireless communication device and retrieved based on the TCI state. In some examples, the LSCP(s) include one or more of a time domain property, a frequency domain property, or a spatial domain property. In some examples, the first wireless communication device may identify a source identifier (ID) of the second wireless communication device associated with the sidelink transmission and utilize the LSCP(s) of the sidelink channel associated with the source ID to process the sidelink transmission. In some examples, the sidelink transmission is a physical sidelink shared channel (PSSCH). For example, the communication and processing circuitry 742 together with the channel acquisition circuitry 744, shown and described above in connection with FIG. 7, may provide a means to process the sidelink transmission.

Figure 10:
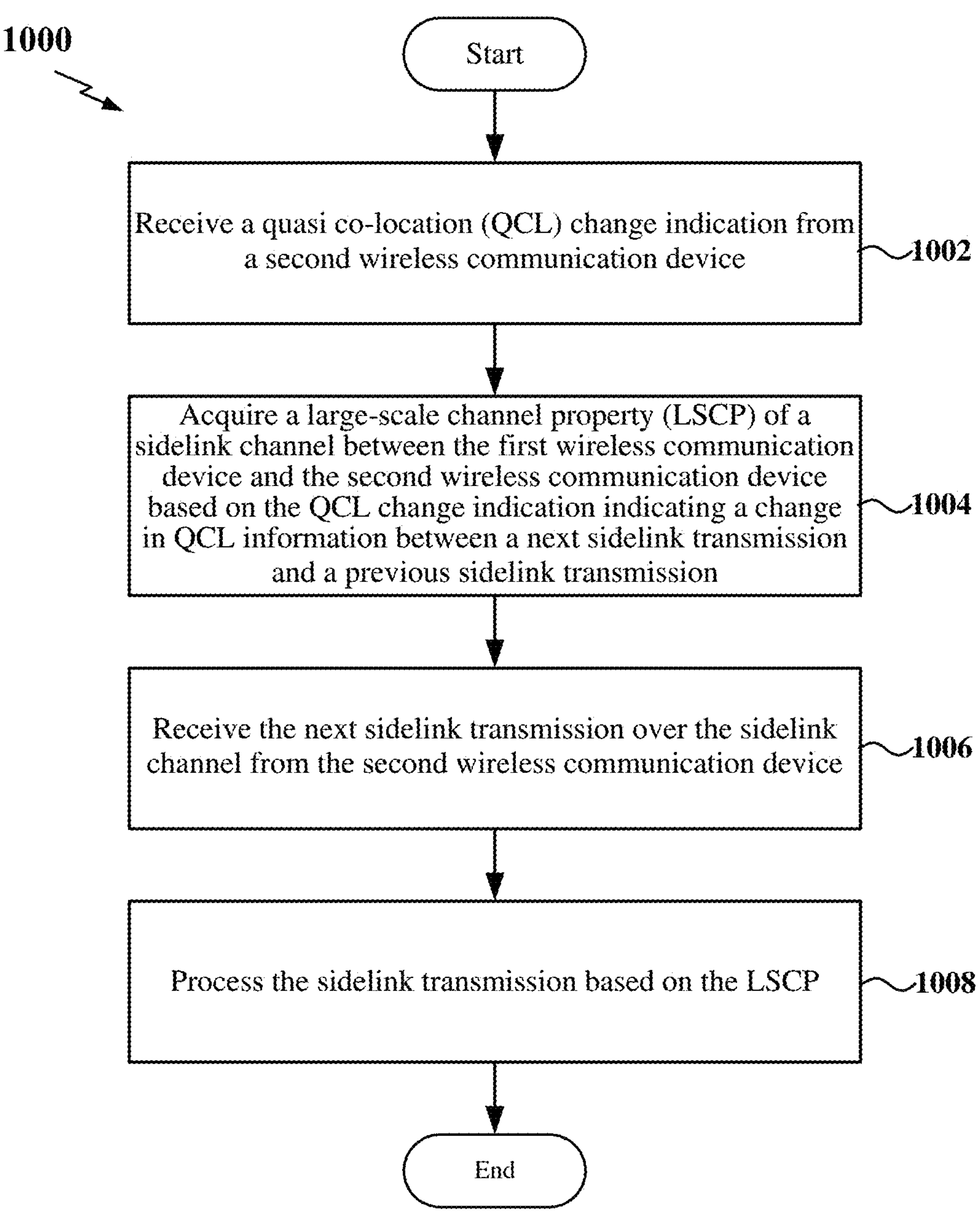
FIG. 10 is a flow chart of another exemplary method for sidelink channel tracking according to some aspects.

FIG. 10 is a flow chart 1000 of another exemplary method for sidelink channel tracking according to some aspects. As described below, some or all illustrated features may be omitted in a particular implementation within the scope of the present disclosure, and some illustrated features may not be required for implementation of all examples. In some examples, the method may be performed by the wireless communication device 700, as described above and illustrated in FIG. 7, by a processor or processing system, or by any suitable means for carrying out the described functions.

At block 1002, the wireless communication device (e.g., a first wireless communication device configured for sidelink communication) may receive a QCL change indication from a second wireless communication device. The QCL change indication may indicate, for example, whether there is a change in QCL information between two consecutive sidelink transmissions (e.g., a previous sidelink transmission and a next sidelink transmission). In some examples, the first wireless communication device may receive the QCL change indication via a sidelink radio resource control (RRC) message or a sidelink medium access control (MAC) control element (MAC-CE). In some examples, the first wireless communication device may receive the QCL change indication via sidelink control information (SCI). For example, the QCL change indication may be included in second stage SCI. For example, the communication and processing circuitry 742 and transceiver 710, shown and described above in connection with FIG. 7, may provide a means to receive the QCL change indication.

At block 1004, the first wireless communication device may acquire a large-scale channel property (LSCP) of a sidelink channel between the first wireless communication device and the second wireless communication device based on the QCL change indication indicating a change in QCL information between a next sidelink transmission and a previous sidelink transmission. For example, the first wireless communication device may acquire the LSCP(s) of the sidelink channel based the next sidelink transmissions (and optionally one or more subsequent sidelink transmissions) received from the second wireless communication device. In some examples, the LSCP(s) include one or more of a time domain property, a frequency domain property, or a spatial domain property. The first wireless communication device may store the acquired LSCP(s) and associate the acquired LSCP(s) with a source identifier (ID) of the second wireless communication device. For example, the channel acquisition circuitry 744, shown and described above in connection with FIG. 7, may provide a means to acquire the LSCP of the sidelink channel.

At block 1006, the first wireless communication device may receive the next sidelink transmission over the sidelink channel from the second wireless communication device. In some examples, the sidelink RRC message or sidelink MAC-CE including the indication of the QCL information may further include a time period after which the QCL change becomes effective. In this example, the first wireless communication device may receive the next sidelink transmission after the time period. For example, the communication and processing circuitry 742 and transceiver 710, shown and described above in connection with FIG. 7, may provide a means to receive the sidelink transmission.

At block 1008, the first wireless communication device may process the sidelink transmission based on the LSCP of the sidelink channel. In some examples, the first wireless communication device may identify the source ID of the second wireless communication device associated with the sidelink transmission and utilize the LSCP of the sidelink channel associated with the source ID to process the sidelink transmission. In some examples, the sidelink transmission is a physical sidelink shared channel (PSSCH). For example, the communication and processing circuitry 742 together with the channel acquisition circuitry 744, shown and described above in connection with FIG. 7, may provide a means to process the sidelink transmission.

Figure 11:
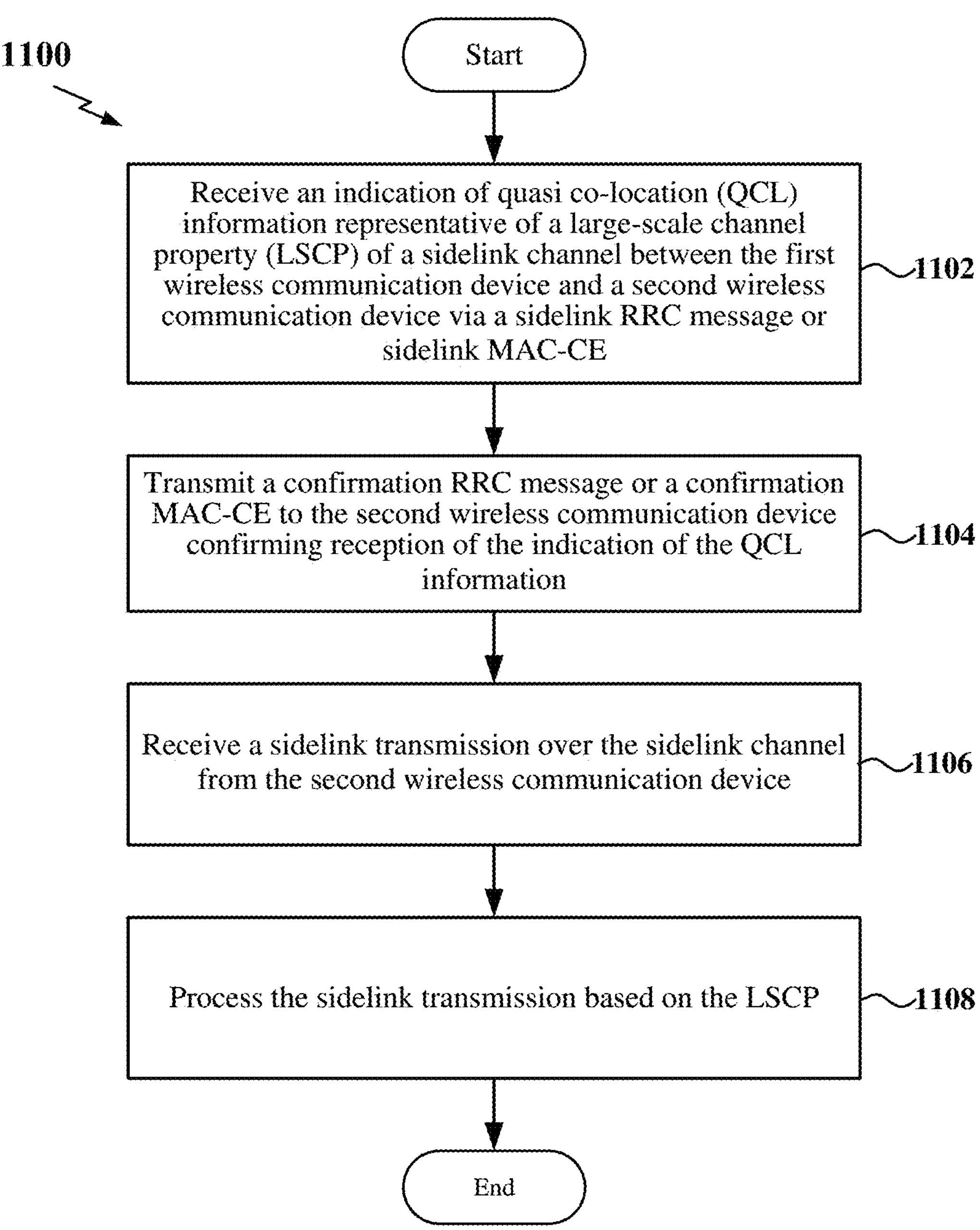
FIG. 11 is a flow chart of another exemplary method for sidelink channel tracking according to some aspects.

FIG. 11 is a flow chart 1100 of another exemplary method for sidelink channel tracking according to some aspects. As described below, some or all illustrated features may be omitted in a particular implementation within the scope of the present disclosure, and some illustrated features may not be required for implementation of all examples. In some examples, the method may be performed by the wireless communication device 700, as described above and illustrated in FIG. 7, by a processor or processing system, or by any suitable means for carrying out the described functions.

At block 1102, the wireless communication device (e.g., a first wireless communication device configured for sidelink communication) may receive an indication of quasi co-location (QCL) information representative of a large-scale channel property (LSCP) of a sidelink channel between the first wireless communication device and a second wireless communication device via a sidelink radio resource control (RRC) message or a sidelink medium access control (MAC) control element (MAC-CE). In some examples, the indication of the QCL information includes a sidelink transmission configuration indicator (TCI) state. In some examples, the indication of the QCL information includes a QCL change indication. For example, the communication and processing circuitry 742 and transceiver 710, shown and described above in connection with FIG. 7, may provide a means to receive the indication of the QCL information.

At block 1104, the first wireless communication device may transmit a confirmation RRC message or a confirmation MAC-CE to the second wireless communication device confirming reception of the indication of the QCL information. For example, the communication and processing circuitry 742 and transceiver 710, shown and described above in connection with FIG. 7, may provide a means to transmit the confirmation RRC message or the confirmation MAC-CE.

At block 1106, the first wireless communication device may receive a sidelink transmission over the sidelink channel from the second wireless communication device. In some examples, the sidelink RRC message or sidelink MAC-CE including the indication of the QCL information may further include a time period after which the QCL information becomes effective. In this example, the first wireless communication device may receive the sidelink transmission after the time period. For example, the communication and processing circuitry 742 and transceiver 710, shown and described above in connection with FIG. 7, may provide a means to receive the sidelink transmission.

At block 1108, the first wireless communication device may process the sidelink transmission based on the LSCP of the sidelink channel. In some examples, the first wireless communication device may identify a source identifier (ID) of the second wireless communication device associated with the sidelink transmission and utilize the LSCP of the sidelink channel associated with the source ID to process the sidelink transmission. In some examples, the sidelink transmission is a physical sidelink shared channel (PSSCH). In examples in which the indication of the QCL information includes a QCL change indication, the first wireless communication device may acquire the LSCP of the sidelink channel based on the QCL change indication indicating a change in QCL information between the sidelink transmission and a previous sidelink transmission. In some examples, the LSCP includes one or more of a time domain property, a frequency domain property, or a spatial domain property. For example, the communication and processing circuitry 742 together with the channel acquisition circuitry 744, shown and described above in connection with FIG. 7, may provide a means to process the sidelink transmission.

In one configuration, the wireless communication device 700 includes means for receiving an indication of quasi co-location (QCL) information representative of a large-scale channel property of a sidelink channel between the first wireless communication device and a second wireless communication device, as described in the present disclosure. The wireless communication device 700 further includes means for receiving a sidelink transmission over the sidelink channel from the second wireless communication device and means for processing the sidelink transmission based on the large-scale channel property of the sidelink channel. In one aspect, the aforementioned means may be the processor 704 shown in FIG. 7 configured to perform the functions recited by the aforementioned means. In another aspect, the aforementioned means may be a circuit or any apparatus configured to perform the functions recited by the aforementioned means.

Of course, in the above examples, the circuitry included in the processor 704 is merely provided as an example, and other means for carrying out the described functions may be included within various aspects of the present disclosure, including but not limited to the instructions stored in the computer-readable storage medium 706, or any other suitable apparatus or means described in any one of the FIGS. 1, 3, 6, and/or 7, and utilizing, for example, the processes and/or algorithms described herein in relation to FIGS. 8-11.

Figure 12:
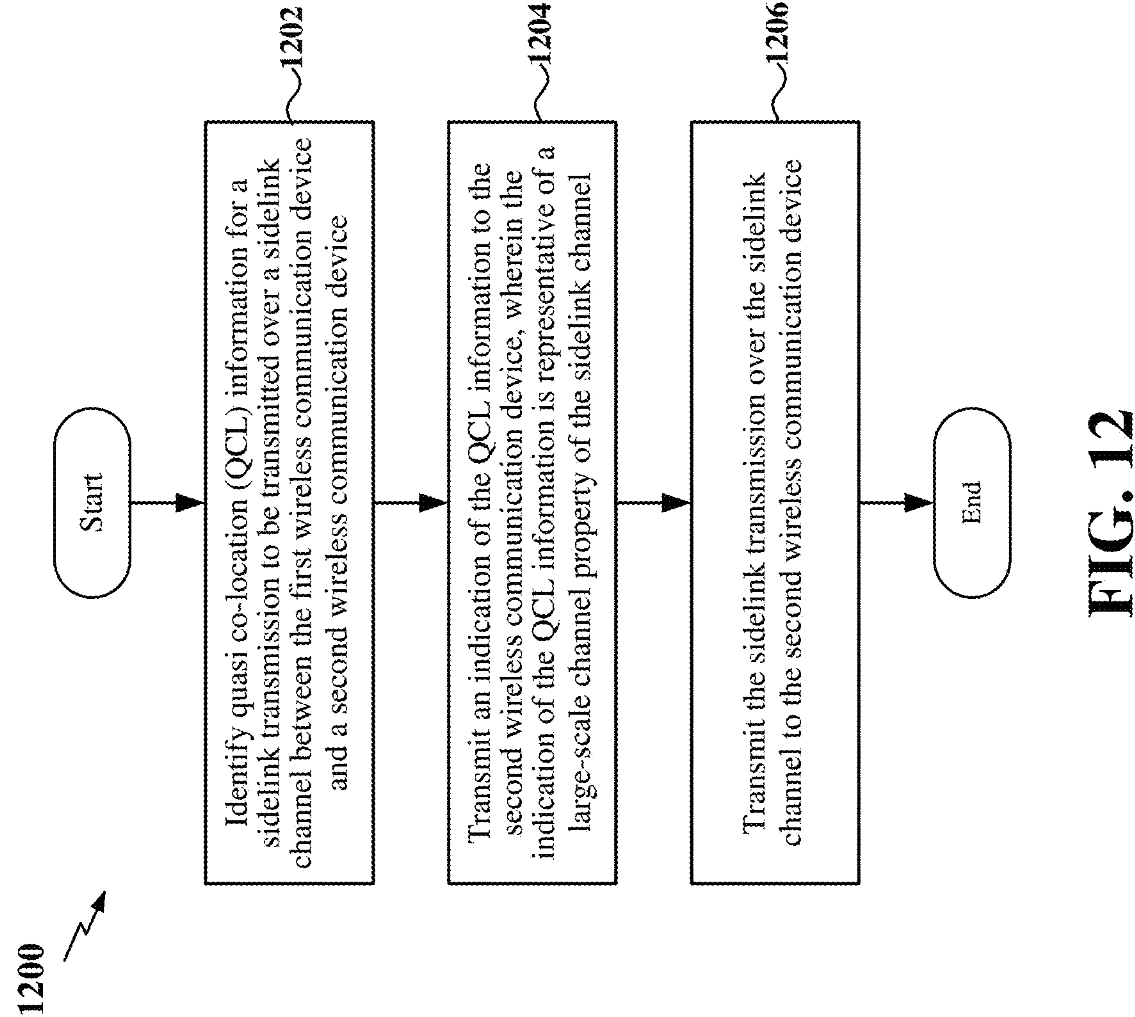
FIG. 12 is a flow chart of another exemplary method for sidelink channel tracking according to some aspects.

FIG. 12 is a flow chart 1200 of another exemplary method for sidelink channel tracking according to some aspects. As described below, some or all illustrated features may be omitted in a particular implementation within the scope of the present disclosure, and some illustrated features may not be required for implementation of all examples. In some examples, the method may be performed by the wireless communication device 700, as described above and illustrated in FIG. 7, by a processor or processing system, or by any suitable means for carrying out the described functions.

At block 1202, the wireless communication device (e.g., a first wireless communication device configured for sidelink communication) may identify quasi co-location (QCL) information for a sidelink transmission to be transmitted over a sidelink channel between the first wireless communication device and a second wireless communication device. In some examples, the QCL information may include a sidelink transmission configuration indicator (TCI) state. In some examples, the QCL information may include a transmit antenna, a transmit beam, and/or a CDD configuration. For example, the QCL selection circuitry 746 shown and described above in connection with FIG. 7 may provide a means to identify the QCL information for the sidelink transmission.

At block 1204, the first wireless communication device may transmit an indication of the QCL information to the second wireless communication device. The indication of the QCL information is representative of a large-scale channel property (LSCP) of the sidelink channel. In some examples, the indication of the QCL information includes the TCI state. In this example, the first wireless communication device may further transmit respective configurations of at least two sidelink TCI states including the sidelink TCI state to the second wireless communication device. In some examples, the indication of the QCL information includes a QCL change indication.

In some examples, the first wireless communication device may receive the indication of the QCL information via a sidelink radio resource control (RRC) message or a sidelink medium access control (MAC) control element (MAC-CE). In this example, the first wireless communication device may further receive a confirmation RRC message or a confirmation MAC-CE from the second wireless communication device confirming reception of the indication of the QCL information. In some examples, the first wireless communication device may receive the indication of the QCL information via sidelink control information (SCI). For example, the QCL change indication may be transmitted within second stage SCI. For example, the communication and processing circuitry 742 and transceiver 710, shown and described above in connection with FIG. 7, may provide a means to transmit the indication of the QCL information.

At block 1206, the first wireless communication device may transmit the sidelink transmission over the sidelink channel to the second wireless communication device. In some examples, the sidelink RRC message or sidelink MAC-CE including the indication of the QCL information may further include a time period after which the QCL information becomes effective. In this example, the first wireless communication device may transmit the sidelink transmission after the time period. For example, the communication and processing circuitry 742 and transceiver 710, shown and described above in connection with FIG. 7, may provide a means to transmit the sidelink transmission.

In one configuration, the wireless communication device 700 includes means for identifying quasi co-location (QCL) information for a sidelink transmission to be transmitted over a sidelink channel between the first wireless communication device and a second wireless communication device, as described in the present disclosure. The wireless communication device 700 further includes means for transmitting an indication of the QCL information to the second wireless communication device, wherein the indication of the QCL information is representative of a large-scale channel property of the sidelink channel and means for transmitting the sidelink transmission over the sidelink channel to the second wireless communication device. In one aspect, the aforementioned means may be the processor 704 shown in FIG. 7 configured to perform the functions recited by the aforementioned means. In another aspect, the aforementioned means may be a circuit or any apparatus configured to perform the functions recited by the aforementioned means.

Of course, in the above examples, the circuitry included in the processor 704 is merely provided as an example, and other means for carrying out the described functions may be included within various aspects of the present disclosure, including but not limited to the instructions stored in the computer-readable storage medium 706, or any other suitable apparatus or means described in any one of the FIGS. 1, 3, 6, and/or 7, and utilizing, for example, the processes and/or algorithms described herein in relation to FIG. 12.

The processes shown in FIGS. 8-12 may include additional aspects, such as any single aspect or any combination of aspects described below and/or in connection with one or more other processes described elsewhere herein.

Aspect 1: A method for wireless communication at a first wireless communication device in a wireless communication network, the method comprising: receiving an indication of quasi co-location (QCL) information representative of a large-scale channel property of a sidelink channel between the first wireless communication device and a second wireless communication device; receiving a sidelink transmission over the sidelink channel from the second wireless communication device; and processing the sidelink transmission based on the large-scale channel property of the sidelink channel.

Aspect 2: The method of aspect 1, wherein the indication of the QCL information comprises a sidelink transmission configuration indicator (TCI) state.

Aspect 3: The method of aspect 2, further comprising: receiving respective configurations of at least two sidelink TCI states comprising the sidelink TCI state from the second wireless communication device.

Aspect 4: The method of aspect 1, wherein the indication of the QCL information comprises a QCL change indication.

Aspect 5: The method of aspect 4, wherein the receiving the indication of the QCL information further comprises: receiving the QCL change indication within second stage sidelink control information (SCI).

Aspect 6: The method of aspect 4 or 5, wherein the processing of the sidelink transmission further comprises: acquiring the large-scale channel property of the sidelink channel based on the QCL change indication indicating a change in the QCL information between the sidelink transmission and a previous sidelink transmission; and processing the sidelink transmission utilizing the large-scale channel property of the sidelink channel.

Aspect 7: The method of any of aspects 1 through 6, wherein the receiving the indication of the QCL information further comprises: receiving the indication of the QCL information via a sidelink radio resource control (RRC) message or a sidelink medium access control (MAC) control element (MAC-CE).

Aspect 8: The method of aspect 7, wherein the sidelink RRC message or the sidelink MAC-CE further comprises a time period after which the QCL information becomes effective.

Aspect 9: The method of aspect 8, wherein the receiving the sidelink transmission further comprises: receiving the sidelink transmission from the second wireless communication device after the time period.

Aspect 10: The method of any of aspects 7 through 9, further comprising: transmitting a confirmation RRC message or a confirmation MAC-CE to the second wireless communication device confirming reception of the indication of the QCL information.

Aspect 11: The method of any of aspects 1 through 10, wherein the receiving the indication of the QCL information further comprises: receiving the indication of the QCL information via sidelink control information.

Aspect 12: The method of any of aspects 1 through 11, wherein the processing the sidelink transmission further comprises: identifying a source identifier (ID) of the second wireless communication device associated with the sidelink transmission, wherein the sidelink transmission comprises a physical sidelink shared channel (PSSCH); and utilizing the large-scale channel property of the sidelink channel associated with the source ID to process the PSSCH.

Aspect 13: The method of any of aspects 1 through 12, wherein the large-scale channel property of the sidelink channel comprises one or more of a time domain property, a frequency domain property, or a spatial domain property.

Aspect 14: A method for wireless communication at a first wireless communication device in a wireless communication network, the method comprising: identifying quasi co-location (QCL) information for a sidelink transmission to be transmitted over a sidelink channel between the first wireless communication device and a second wireless communication device; transmitting an indication of the QCL information to the second wireless communication device, wherein the indication of the QCL information is representative of a large-scale channel property of the sidelink channel; and transmitting the sidelink transmission over the sidelink channel to the second wireless communication device.

Aspect 15: The method of aspect 14, wherein the indication of the QCL information comprises a sidelink transmission configuration indicator (TCI) state.

Aspect 16: The method of aspect 15, further comprising: transmitting respective configurations of at least two sidelink TCI states comprising the sidelink TCI state to the second wireless communication device.

Aspect 17: The method of aspect 14, wherein the indication of the QCL information comprises a QCL change indication.

Aspect 18: The method of aspect 17, wherein the transmitting the indication of the QCL information further comprises: transmitting the QCL change indication within second stage sidelink control information (SCI).

Aspect 19: The method of any of aspects 14 through 18, wherein the transmitting the indication of the QCL information further comprises: transmitting the indication of the QCL information via a sidelink radio resource control (RRC) message or a sidelink medium access control (MAC) control element (MAC-CE).

Aspect 20: The method of aspect 19, wherein the sidelink RRC message or the sidelink MAC-CE further comprises a time period after which the QCL information becomes effective.

Aspect 21: The method of aspect 19 or 20, further comprising: receiving a confirmation RRC message or a confirmation MAC-CE from the second wireless communication device confirming reception of the indication of the QCL information.

Aspect 22: An apparatus in a wireless communication network comprising a transceiver, a memory, and a processor coupled to the transceiver and the memory, the processor and the memory configured to perform a method of any one of aspects 1 through 13 or aspects 14 through 21.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word “exemplary” is used to mean “serving as an example, instance, or illustration.” Any implementation or aspect described herein as “exemplary” is not necessarily to be construed as preferred or advantageous over other aspects of the disclosure. Likewise, the term “aspects” does not require that all aspects of the disclosure include the discussed feature, advantage or mode of operation. The term “coupled” is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms “circuit” and “circuitry” are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 3, 6, and/or 7 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean “one and only one” unless specifically so stated, but rather “one or more.” Unless specifically stated otherwise, the term “some” refers to one or more. A phrase referring to “at least one of” a list of items refers to any combination of those items, including single members. As an example, “at least one of: a, b, or c” is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a first wireless communication device, the method comprising:

receiving an indication of quasi co-location (QCL) information representative of a large-scale channel property of a sidelink channel between the first wireless communication device and a second wireless communication device via a sidelink radio resource control (RRC) message or a sidelink medium access control (MAC) control element (MAC-CE);

receiving a sidelink transmission over the sidelink channel from the second wireless communication device;

processing the sidelink transmission based on the large-scale channel property of the sidelink channel; and transmitting a confirmation RRC message or a confirmation MAC-CE to the second wireless communication device confirming reception of the indication of the QCL information.

2. The method of claim 1, wherein the indication of the QCL information comprises a sidelink transmission configuration indicator (TCI) state.

3. The method of claim 2, further comprising:

receiving respective configurations of at least two sidelink TCI states comprising the sidelink TCI state from the second wireless communication device.

4. The method of claim 1, wherein the indication of the QCL information comprises a QCL change indication.

5. The method of claim 4, wherein the processing of the sidelink transmission further comprises:

acquiring the large-scale channel property of the sidelink channel based on the QCL change indication indicating a change in the QCL information between the sidelink transmission and a previous sidelink transmission; and processing the sidelink transmission utilizing the large-scale channel property of the sidelink channel.

6. The method of claim 1, wherein the sidelink RRC message or the sidelink MAC-CE further comprises a time period after which the QCL information becomes effective.

7. The method of claim 6, wherein the receiving the sidelink transmission further comprises:

receiving the sidelink transmission from the second wireless communication device after the time period.

8. The method of claim 1, wherein the processing the sidelink transmission further comprises:

identifying a source identifier (ID) of the second wireless communication device associated with the sidelink transmission, wherein the sidelink transmission comprises a physical sidelink shared channel (PSSCH); and utilizing the large-scale channel property of the sidelink channel associated with the source ID to process the PSSCH.

9. The method of claim 1, wherein the large-scale channel property of the sidelink channel comprises one or more of a time domain property, a frequency domain property, or a spatial domain property.

10. A first wireless communication device, comprising:

one or more memories; and one or more processors coupled to the one or more memories, wherein the one or more processors are configured to cause the first wireless communication device to:

receive an indication of quasi co-location (QCL) information representative of a large-scale channel property of a sidelink channel between the first wireless communication device and a second wireless communication device via a sidelink radio resource control (RRC) message or a sidelink medium access control (MAC) control element (MAC-CE);

receive a sidelink transmission over the sidelink channel from the second wireless communication device;

process the sidelink transmission based on the large-scale channel property of the sidelink channel; and transmit a confirmation RRC message or a confirmation MAC-CE to the second wireless communication device confirming reception of the indication of the QCL information.

11. The first wireless communication device of claim 10, wherein the indication of the QCL information comprises a sidelink transmission configuration indicator (TCI) state.

12. The first wireless communication device of claim 10, wherein the indication of the QCL information comprises a QCL change indication.

13. The first wireless communication device of claim 12, wherein the one or more processors are further configured to cause the first wireless communication device to:

acquire the large-scale channel property of the sidelink channel based on the QCL change indication indicating a change in the QCL information between the sidelink transmission and a previous sidelink transmission; and process the sidelink transmission utilizing the large-scale channel property of the sidelink channel.

14. The first wireless communication device of claim 10, wherein the sidelink RRC message or the sidelink MAC-CE further comprises a time period after which the QCL information becomes effective.

15. A method for wireless communication at a second wireless communication device, the method comprising:

identifying quasi co-location (QCL) information for a sidelink transmission to be transmitted over a sidelink channel between the second wireless communication device and a first wireless communication device;

transmitting an indication of the QCL information to the first wireless communication device via a sidelink radio resource control (RRC) message or a sidelink medium access control (MAC) control element (MAC-CE), wherein the indication of the QCL information is representative of a large-scale channel property of the sidelink channel;

transmitting the sidelink transmission over the sidelink channel to the first wireless communication device; and receiving a confirmation RRC message or a confirmation MAC-CE from the first wireless communication device confirming reception of the indication of the QCL information.

16. The method of claim 15, wherein the indication of the QCL information comprises a sidelink transmission configuration indicator (TCI) state.

17. The method of claim 16, further comprising:

transmitting respective configurations of at least two sidelink TCI states comprising the sidelink TCI state to the first wireless communication device.

18. The method of claim 15, wherein the indication of the QCL information comprises a QCL change indication.

19. The method of claim 15, wherein the sidelink RRC message or the sidelink MAC-CE further comprises a time period after which the QCL information becomes effective.

20. A second wireless communication device, comprising:

one or more memories; and one or more processors coupled to the one or more memories, wherein the one or more processors are configured to cause the second wireless communication device to:

identify quasi co-location (QCL) information for a sidelink transmission to be transmitted over a sidelink channel between the second wireless communication device and a first wireless communication device;

transmit an indication of the QCL information to the first wireless communication device via a sidelink radio resource control (RRC) message or a sidelink medium access control (MAC) control element (MAC-CE), wherein the indication of the QCL information is representative of a large-scale channel property of the sidelink channel;

transmit the sidelink transmission over the sidelink channel to the first wireless communication device; and receive a confirmation RRC message or a confirmation MAC-CE from the first wireless communication device confirming reception of the indication of the QCL information.

* * * * *